US012521986B2

(12) United States Patent
Tamura

(10) Patent No.: US 12,521,986 B2
(45) Date of Patent: Jan. 13, 2026

(54) LIQUID EJECTING HEAD

(71) Applicant: SEIKO EPSON CORPORATION, Tokyo (JP)

(72) Inventor: Hiroaki Tamura, Shimosuwa (JP)

(73) Assignee: SEIKO EPSON CORPORATION (JP)

( * ) Notice: Subject to any disclaimer, the term of this patent is extended or adjusted under 35 U.S.C. 154(b) by 152 days.

(21) Appl. No.: 18/621,306

(22) Filed: Mar. 29, 2024

(65) Prior Publication Data

US 2024/0326426 A1 Oct. 3, 2024

(30) Foreign Application Priority Data

Mar. 30, 2023 (JP) ................................ 2023-054581

(51) Int. Cl.
*B41J 2/14* (2006.01)

(52) U.S. Cl.
CPC .. *B41J 2/14233* (2013.01); *B41J 2002/14258* (2013.01)

(58) Field of Classification Search
CPC .......... B41J 2/14233; B41J 2002/14258; B41J 2002/14241; B41J 2002/14362; B41J 2002/14459; B41J 2002/14491; B41J 2/14201
See application file for complete search history.

(56) References Cited

FOREIGN PATENT DOCUMENTS

| | | | | |
|---|---|---|---|---|
| JP | 2014188767 A | * 10/2014 | ............ | B41J 2/1637 |
| JP | 2019-005924 A | 1/2019 | | |

OTHER PUBLICATIONS

Zhang Junhua, "Manufacturing Method of Liquid Jet Head" (JP 2014188767 A), Oct. 6, 2014, [Abstract, Embodiment 1, and Figs. 2(a)-2(b)] (Year: 2014).*

* cited by examiner

*Primary Examiner* — Lisa Solomon
(74) *Attorney, Agent, or Firm* — Harness, Dickey & Pierce, P.L.C.

(57) ABSTRACT

A liquid ejecting head includes a piezoelectric element, a diaphragm, a reinforcing film, and a pressure chamber substrate. The reinforcing film is formed along a first direction, overlaps a boundary between the partition wall and the pressure chamber, and satisfies Y1>Y2 and 0<a1<a2 where Y1 is a first thickness of the reinforcing film in the lamination direction at a first position, Y2 is a second thickness of the reinforcing film in the lamination direction at a second position closer to the center of the pressure chamber than the first position, a1 is an absolute value of a slope of a first tangent line, to an inclined surface as a surface of the reinforcing film that is not in contact with the diaphragm, at the first position, and a2 is an absolute value of a slope of a second tangent line at the second position.

9 Claims, 16 Drawing Sheets

LIQUID EJECTING HEAD

The present application is based on, and claims priority from JP Application Serial Number 2023-054581, filed Mar. 30, 2023, the disclosure of which is hereby incorporated by reference herein in its entirety.

BACKGROUND

1. Technical Field

The present disclosure relates to a liquid ejecting head.

2. Related Art

As described in JP-A-2019-5924, it is known that in a liquid ejecting head, a reinforcing film is provided on a diaphragm to suppress the occurrence of cracks in the diaphragm. The diaphragm has a boundary section between a section located on a partition wall separating adjacent pressure chambers and a section located above the pressure chamber. The diaphragm is coupled to the partition wall and thus vibrates at the boundary section. That is, the occurrence of this crack is caused by stress concentrated at the boundary section of the diaphragm. Therefore, the reinforcing film is formed along the boundary section. The reinforcing film is formed on the surface opposite to the surface of the diaphragm where the pressure chamber is provided. The reinforcing film is formed so as to cover the boundary section from this opposite surface. Therefore, the reinforcing film prevents stress concentration at the boundary section of the diaphragm by suppressing deformation of the diaphragm at the boundary section.

However, even when the reinforcing film is provided, the diaphragm vibrates at a point other than the boundary section. Specifically, the diaphragm vibrates at a boundary between a portion where the reinforcing film is provided and a portion where the reinforcing film is not provided, that is, at an end portion of the reinforcing film. Therefore, stress concentration may occur at the end portion of the reinforcing film. Therefore, there is still a risk that cracks may occur.

SUMMARY

The present disclosure can be realized as the following aspect or application example.

According to a first aspect of the present disclosure, a liquid ejecting head is provided. A liquid ejecting head includes: a piezoelectric element that includes a first electrode, a piezoelectric layer, and a second electrode, which are laminated in a lamination direction, and that deforms when a voltage is applied; a diaphragm that vibrates by driving the piezoelectric element; a reinforcing film; and a pressure chamber substrate constituting a partition wall that defines a pressure chamber communicated with a nozzle, together with the diaphragm, wherein the diaphragm applies pressure to a liquid in the pressure chamber by being vibrated in the lamination direction by the piezoelectric element, the reinforcing film is formed along a first direction that is perpendicular to the lamination direction, overlaps a boundary between the partition wall and the pressure chamber when viewed in the lamination direction, and satisfies Formula (1) and Formula (2) below, $$Y1 > Y2 \quad (1)$$

and $$0 < a1 < a2 \quad (2)$$

where Y1 is a first thickness of the reinforcing film in the lamination direction at a first position as a position of the boundary, Y2 is a second thickness of the reinforcing film in the lamination direction at a second position closer to the center of the pressure chamber than the first position, a1 is an absolute value of a slope of a first tangent line, to an inclined surface as a surface of the reinforcing film that is not in contact with the diaphragm, at the first position, a2 is an absolute value of a slope of a second tangent line at the second position, in a cross section parallel to the lamination direction and a direction from the boundary to the center of the pressure chamber.

DESCRIPTION OF EMBODIMENTS

A. First Embodiment

A1. Overall Configuration of Liquid Ejecting Apparatus

Figure 1:
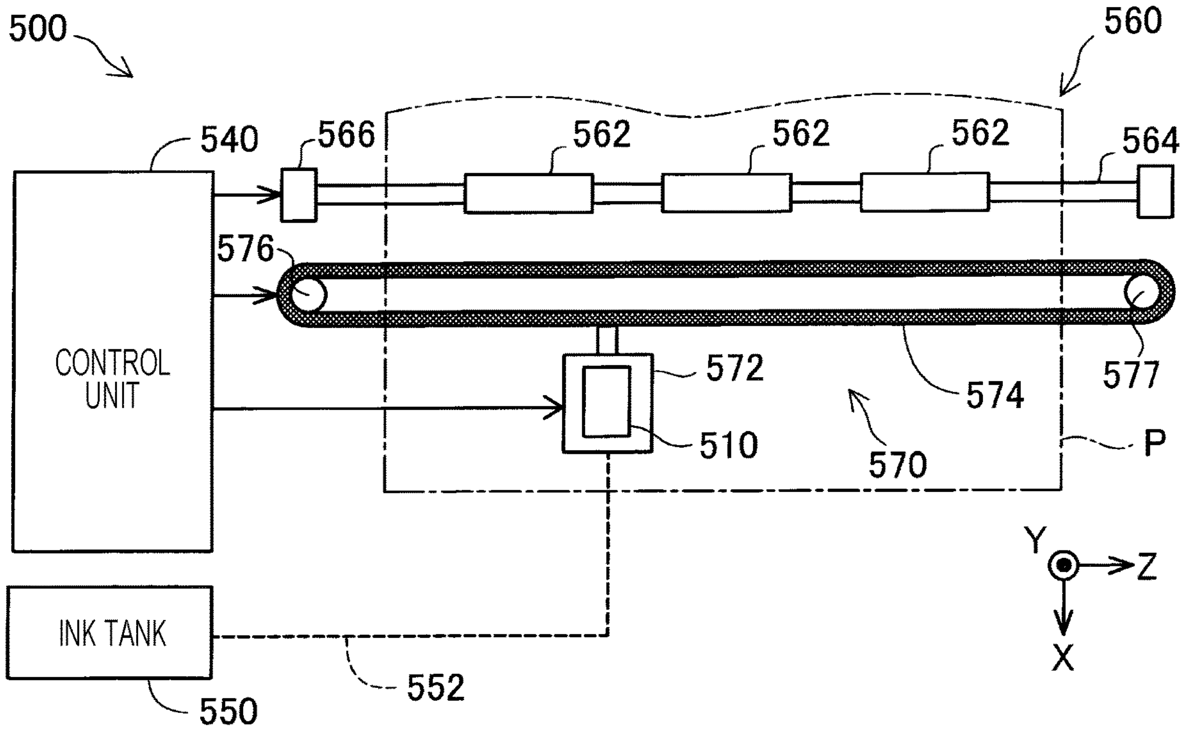
FIG. 1 is a block diagram illustrating a schematic configuration of a liquid ejecting apparatus.

FIG. 1 is a block diagram illustrating a schematic configuration of a liquid ejecting apparatus 500 including a liquid ejecting head 510 according to a first embodiment of the present disclosure. In this embodiment, the liquid ejecting apparatus 500 is configured as an ink jet printer, which ejects ink onto printing paper P to form an image. FIG. 1 illustrates three axes that are orthogonal to each other: an X-axis, a Y-axis, and a Z-axis. The X-axis, Y-axis, and Z-axis illustrated in other drawings all correspond to the X-axis, Y-axis, and Z-axis in FIG. 1. When specifying the direction, both positive and negative signs are used to indicate direction, "+" for the positive direction and "−" for the negative direction.

The liquid ejecting apparatus 500 includes the liquid ejecting head 510, an ink tank 550, a transport mechanism 560, a moving mechanism 570, and a control unit 540.

The liquid ejecting head 510 has a number of nozzles 21 and ejects ink in a −Y direction to form an image on the printing paper P. The configuration of the liquid ejecting head 510 will be described in detail later. Examples of the ink to be ejected include four colors of ink in total: black, cyan, magenta, and yellow. The liquid ejecting head 510 is mounted on a carriage 572 to be described later, which is included in the moving mechanism 570. The liquid ejecting head 510 reciprocates in a main scanning direction as the carriage 572 moves. In this embodiment, the main scanning direction is a +Z direction and a −Z direction. The +Z direction and the −Z direction are also referred to as the "Z-axis direction".

The ink tank 550 stores ink to be ejected from the liquid ejecting head 510. The ink tank 550 is not mounted on the carriage 572. The ink tank 550 and the liquid ejecting head 510 are coupled by a resin tube 552. The ink is supplied from the ink tank 550 to the liquid ejecting head 510 through the tube 552.

The transport mechanism 560 transports the printing paper P in a sub-scanning direction. The sub-scanning direction is a direction perpendicular to the Z-axis direction, that is, the main scanning direction, and is a +X direction and a −X direction in this embodiment. The +X direction and the −X direction are also referred to as the "X-axis direction". The transport mechanism 560 includes: a transport rod 564 with three transport rollers 562 attached thereto; and a transport motor 566 that rotationally drives the transport rod 564. AS the transport motor 566 rotationally drives the transport rod 564, the plurality of transport rollers 562 rotate to transport the printing paper P in the +X direction, that is, the sub-scanning direction.

The moving mechanism 570 includes a transport belt 574, a moving motor 576, and a pulley 577, in addition to the carriage 572 described above. The liquid ejecting head 510 is mounted on the carriage 572 in a state of being able to eject the ink. The carriage 572 is attached to the transport belt 574. The transport belt 574 is stretched between the moving motor 576 and the pulley 577. Since the moving motor 576 is a rotary motor, the transport belt 574 reciprocates in the main scanning direction. This also causes the carriage 572 attached to the transport belt 574 to reciprocate in the main scanning direction.

The control unit 540 controls the entire liquid ejecting apparatus 500. For example, the control unit 540 controls the reciprocating movement of the carriage 572 along the main scanning direction and the transporting operation of the printing paper P along the sub-scanning direction. In this embodiment, the control unit 540 also functions as a drive control unit for a piezoelectric actuator to be described later. That is, the control unit 540 controls ink ejection onto the printing paper P by outputting a drive signal to the liquid ejecting head 510 to drive the piezoelectric actuator. The control unit 540 includes, for example, a processing circuit such as a central processing unit (CPU) or a field programmable gate array (FPGA), and a storage circuit such as a semiconductor memory.

A2. Detailed Configuration of Liquid Ejecting Head

Figure 2:
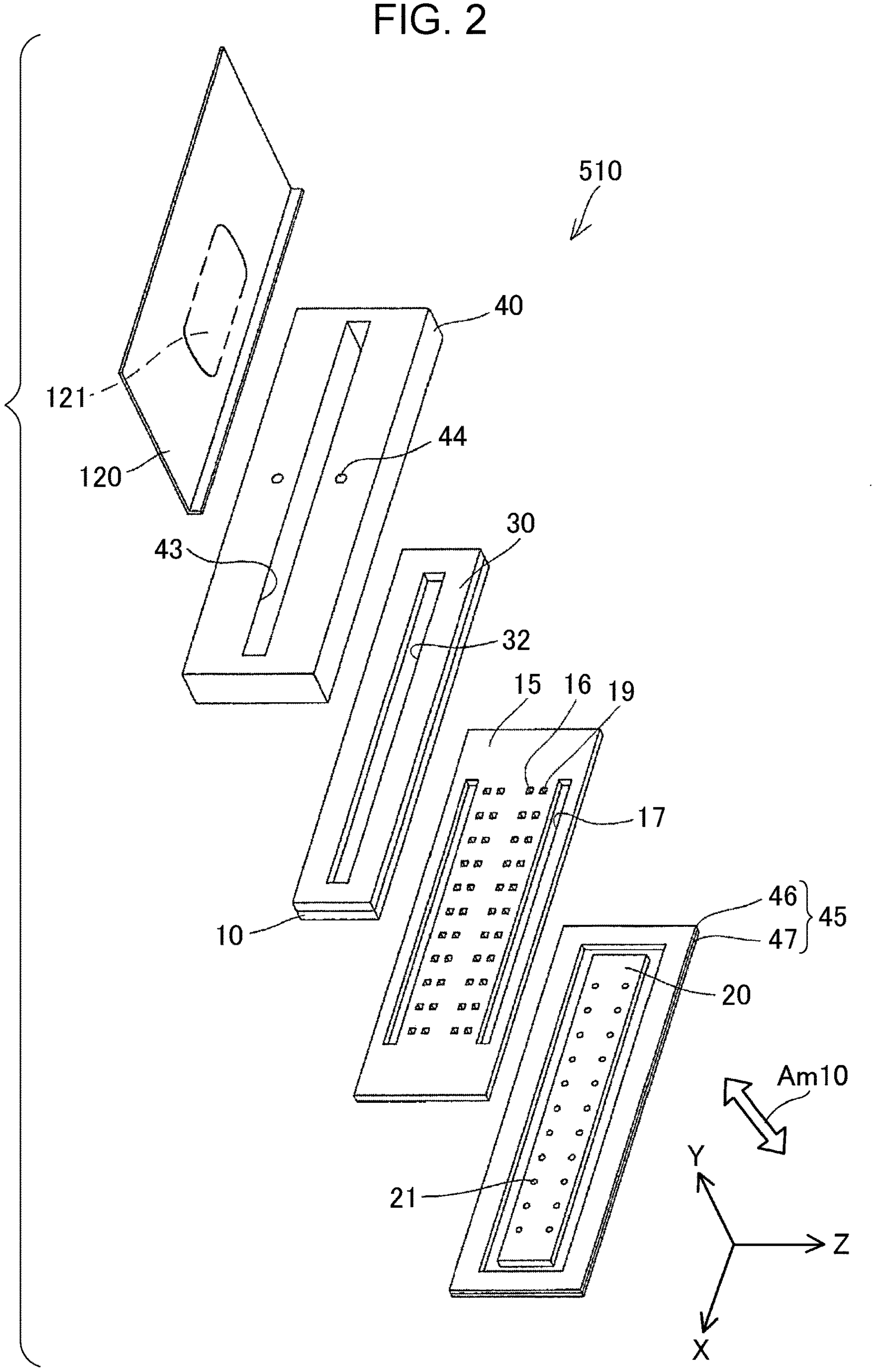
FIG. 2 is an exploded perspective view illustrating a configuration of a liquid ejecting head.
Figure 3:
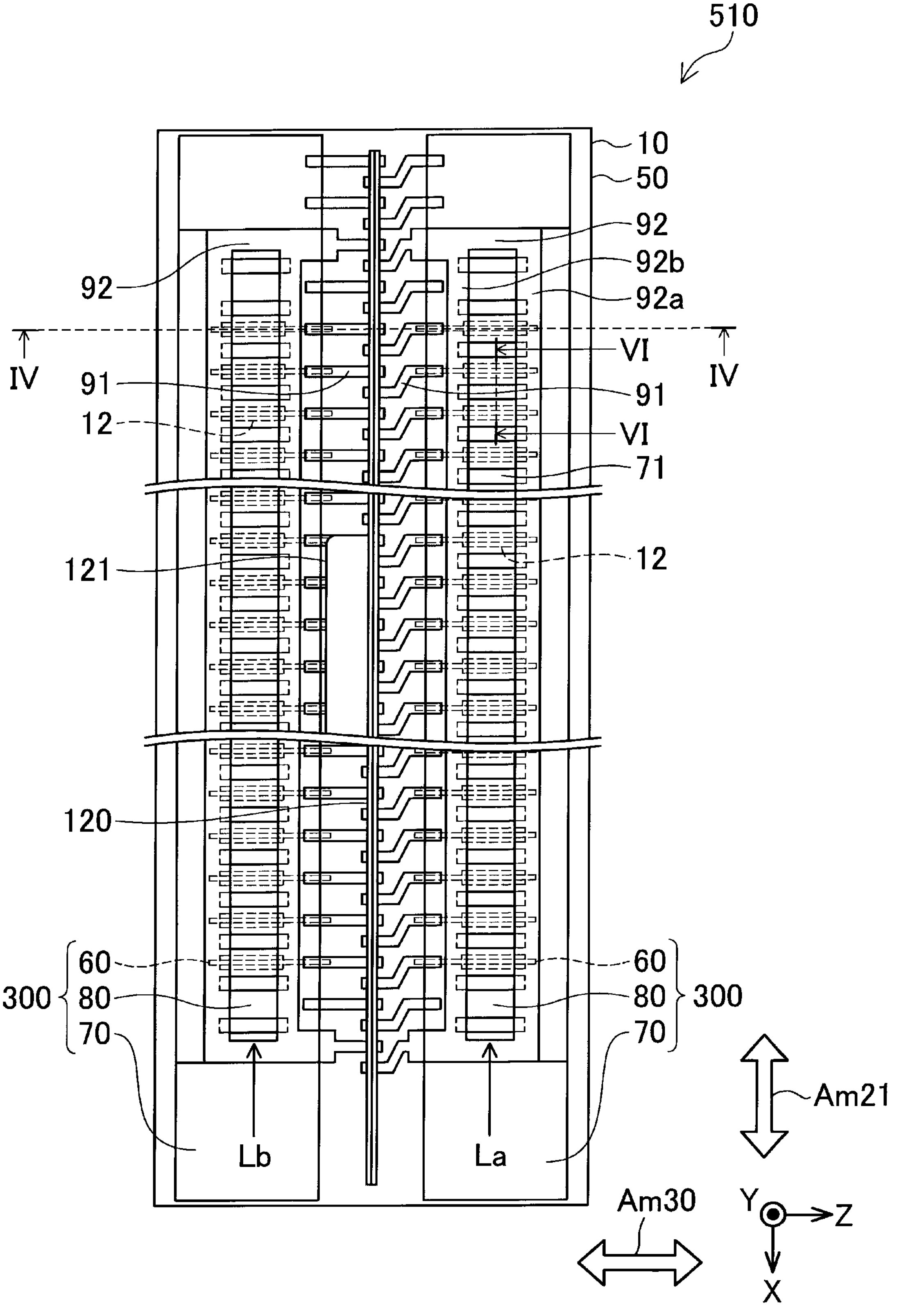
FIG. 3 is an explanatory diagram illustrating the configuration of the liquid ejecting head in plan view.
Figure 4:
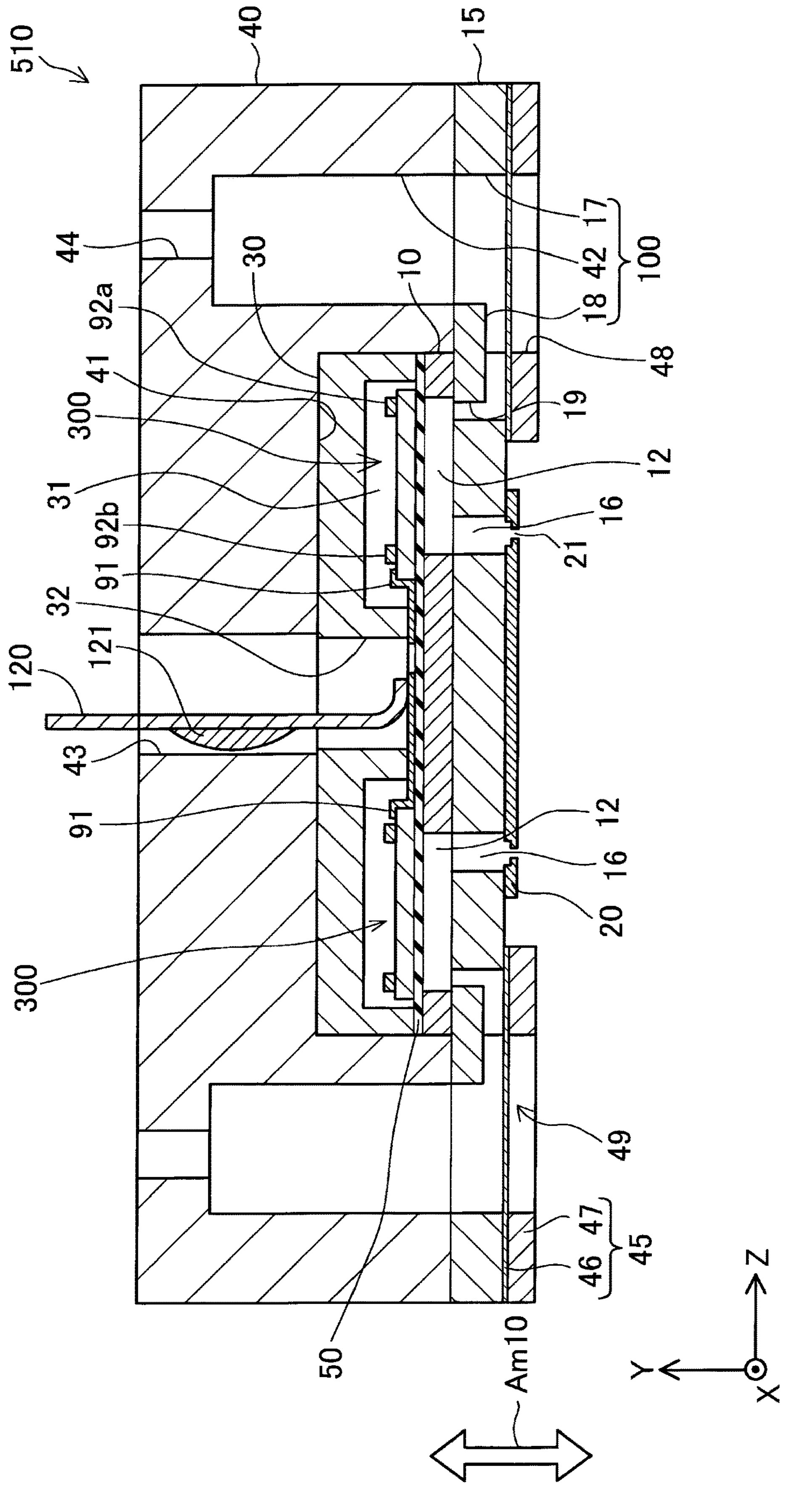
FIG. 4 is a cross-sectional view taken along line IV-IV in FIG. 3.

FIG. 2 is an exploded perspective view illustrating a configuration of the liquid ejecting head 510. FIG. 3 is an explanatory diagram illustrating the configuration of the liquid ejecting head 510 in plan view. FIG. 3 illustrates the configuration around a pressure chamber substrate 10 in the liquid ejecting head 510. FIG. 3 omits a protection substrate 30 and a case member 40 to facilitate understanding of the technology. FIG. 4 is a cross-sectional view taken along line IV-IV in FIG. 3.

As illustrated in FIG. 2, the liquid ejecting head 510 includes the pressure chamber substrate 10, a communication plate 15, a nozzle plate 20, a compliance substrate 45, the protection substrate 30, the case member 40, and a wiring substrate 120. The liquid ejecting head 510 further includes a piezoelectric element 300 illustrated in FIG. 3 and a diaphragm 50 illustrated in FIG. 4. The pressure chamber substrate 10, the communication plate 15, the nozzle plate 20, the compliance substrate 45, the diaphragm 50, the piezoelectric element 300, the protection substrate 30, and the case member 40 are laminated members, which are laminated to form the liquid ejecting head 510. In the present disclosure, the direction in which the laminated members are laminated to form the liquid ejecting head 510 is also referred to as a lamination direction Am10. The +Y direction and −Y direction are also referred to as the "Y-axis direction". The lamination direction Am10 is also a direction along the +Y-axis direction.

The pressure chamber substrate 10 is formed using a silicon substrate, for example. In the pressure chamber substrate 10, as illustrated in FIG. 3, a plurality of pressure chambers 12 are arranged along a predetermined direction. The direction in which the plurality of pressure chambers 12 are arranged is also referred to as an arrangement direction Am21. The +X direction and −X direction are also referred to as the "X-axis direction". The arrangement direction Am21 is also a direction along the X-axis direction. The pressure chamber 12 is formed into a rectangular shape whose length in the Z-axis direction is longer than that in the X-axis direction in plan view.

In this embodiment, the plurality of pressure chambers 12 are arranged in two arrays with the X-axis direction being the arrangement direction Am21. In the example of FIG. 3, the pressure chamber substrate 10 has two pressure chamber arrays formed therein: a first pressure chamber array La whose arrangement direction Am21 is the X-axis direction, and a second pressure chamber array Lb whose arrangement direction Am21 is the X-axis direction. The second pressure chamber array Lb is disposed adjacent to the first pressure chamber array La in a direction intersecting the arrangement direction Am21 of the first pressure chamber array La. The direction intersecting the arrangement direction Am21 is also referred to as an intersecting direction Am30. In the example of FIG. 3, the intersecting direction Am30 is the Z-axis direction, and the second pressure chamber array Lb is adjacent to the first pressure chamber array La in the −Z direction.

The plurality of pressure chambers 12 belonging to the first pressure chamber array La and the plurality of pressure chambers 12 belonging to the second pressure chamber array Lb are disposed in the same positions in the arrangement direction Am21 so as to be adjacent to each other in the intersecting direction Am30. In each pressure chamber array, the pressure chambers 12 adjacent to each other in the X-axis direction are partitioned by partition walls 11 illustrated in FIG. 6, as described later.

As illustrated in FIG. 2, the communication plate 15, the nozzle plate 20, and the compliance substrate 45 are laminated in this order on the −Y direction side of the pressure chamber substrate 10. The communication plate 15 is, for example, a flat member using a silicon substrate. As illustrated in FIG. 4, the communication plate 15 is provided with a nozzle communication path 16, a first manifold section 17, a second manifold section 18, and a supply communication path 19.

As illustrated in FIG. 4, the nozzle communication path 16 is a flow path that communicates the pressure chamber 12 with the nozzle 21. The first manifold section 17 and the second manifold section 18 function as part of a manifold 100 that serves as a common liquid chamber communicated with the plurality of pressure chambers 12. The first manifold section 17 is provided penetrating the communication plate 15 in the Y-axis direction. The second manifold section 18, on the other hand, is provided on the −Y direction side surface of the communication plate 15 without penetrating the communication plate 15 in the Y-axis direction, as illustrated in FIG. 4.

The supply communication path 19 is a flow path communicated with one end of the pressure chamber 12 in the Z-axis direction. A plurality of supply communication paths 19 are arranged along the X-axis direction, that is, the arrangement direction Am21, and are individually provided for each of the pressure chambers 12. The supply communication path 19 communicates the second manifold section 18 with each pressure chamber 12 and supplies ink in the manifold 100 to each pressure chamber 12.

The nozzle plate 20 is provided on the side opposite to the pressure chamber substrate 10 across the communication plate 15, that is, on the surface of the communication plate 15 on the +Y direction side. A material of the nozzle plate 20 is, for example, a silicon substrate.

A plurality of nozzles 21 are formed in the nozzle plate 20. Each nozzle 21 is communicated with each pressure chamber 12 through the nozzle communication path 16. As illustrated in FIG. 2, the plurality of nozzles 21 are arranged along the arrangement direction Am21 of the pressure chambers 12, that is, the X-axis direction. The nozzle plate 20 is provided with two nozzle arrays in which the plurality of nozzles 21 are arranged. The two nozzle arrays correspond to the first pressure chamber array La and the second pressure chamber array Lb, respectively.

As illustrated in FIG. 4, the compliance substrate 45 is provided together with the nozzle plate 20 on the side opposite to the pressure chamber substrate 10 across the communication plate 15, that is, on the +Y direction side surface of the communication plate 15. The compliance substrate 45 is provided around the nozzle plate 20 and covers the openings of the first manifold section 17 and the second manifold section 18 provided in the communication plate 15. In this embodiment, the compliance substrate 45 includes a sealing film 46 made of a flexible thin film and a fixed substrate 47 made of a hard material such as metal. As illustrated in FIG. 4, a region of the fixed substrate 47 facing the manifold 100 is completely removed in the thickness direction to form an opening 48. Therefore, one side of the manifold 100 serves as a compliance section 49 sealed only with the sealing film 46.

As illustrated in FIG. 4, the diaphragm 50 and the piezoelectric element 300 are laminated on the side opposite to the nozzle plate 20 and the like across the pressure chamber substrate 10, that is, on the −Y direction side of the pressure chamber substrate 10. The piezoelectric element 300 changes ink pressure inside the pressure chamber 12 by flexurally deforming the diaphragm 50. The configuration of the piezoelectric element 300 is simplified and illustrated in FIG. 4 to facilitate understanding of the technology. The piezoelectric element 300 will be described in detail later. The diaphragm 50 is provided on the −Y direction side of the piezoelectric element 300, while the pressure chamber substrate 10 is provided on the +Y direction side of the diaphragm 50.

As illustrated in FIG. 4, the protection substrate 30 having substantially the same size as the pressure chamber substrate 10 is further bonded to the +Y direction side surface of the pressure chamber substrate 10 with an adhesive or the like. The protection substrate 30 has a holding section 31 that is a space to protect the piezoelectric element 300. The holding section 31 is provided for each of the piezoelectric elements 300 arranged along the arrangement direction Am21. In this embodiment, two holding sections 31 are formed side by side in the Z-axis direction. In the protection substrate 30, a through-hole 32 is provided between the two holding sections 31 so as to extend along the X-axis direction and penetrate along the Y-axis direction.

As illustrated in FIG. 4, the case member 40 is fixed on the protection substrate 30. The case member 40 forms, together with the communication plate 15, the manifold 100 communicated with the plurality of pressure chambers 12. The case member 40 has substantially the same external shape as the communication plate 15 in plan view, and is joined over the protection substrate 30 and the communication plate 15.

The case member 40 has a housing section 41, a supply port 44, a third manifold section 42, and a coupling port 43. The housing section 41 is a space having a depth capable of housing the pressure chamber substrate 10 and the protection substrate 30. The third manifold section 42 is a space formed on both outer sides of the housing section 41 in the Z-axis direction in the case member 40. The manifold 100 is formed by coupling the third manifold section 42 to the first manifold section 17 and the second manifold section 18 provided in the communication plate 15. The manifold 100 has an elongated shape that is continuous in the X-axis direction. The supply port 44 is communicated with the manifold 100 and supplies ink to each manifold 100. The coupling port 43 is a through-hole communicated with the through-hole 32 in the protection substrate 30, into which the wiring substrate 120 is inserted.

In the liquid ejecting head 510 according to this embodiment, ink supplied from the ink tank 550 illustrated in FIG. 1 is taken in from the supply port 44 illustrated in FIG. 4. After filling the internal flow path from the manifold 100 to the nozzles 21 with the ink, a voltage based on a drive signal is applied to each piezoelectric element 300 corresponding to the plurality of pressure chambers 12. This causes flexural deformation of the diaphragm 50 together with the piezoelectric element 300 to be described later, thus increasing the pressure inside each pressure chamber 12 to eject ink droplets from each nozzle 21.

Figure 5:
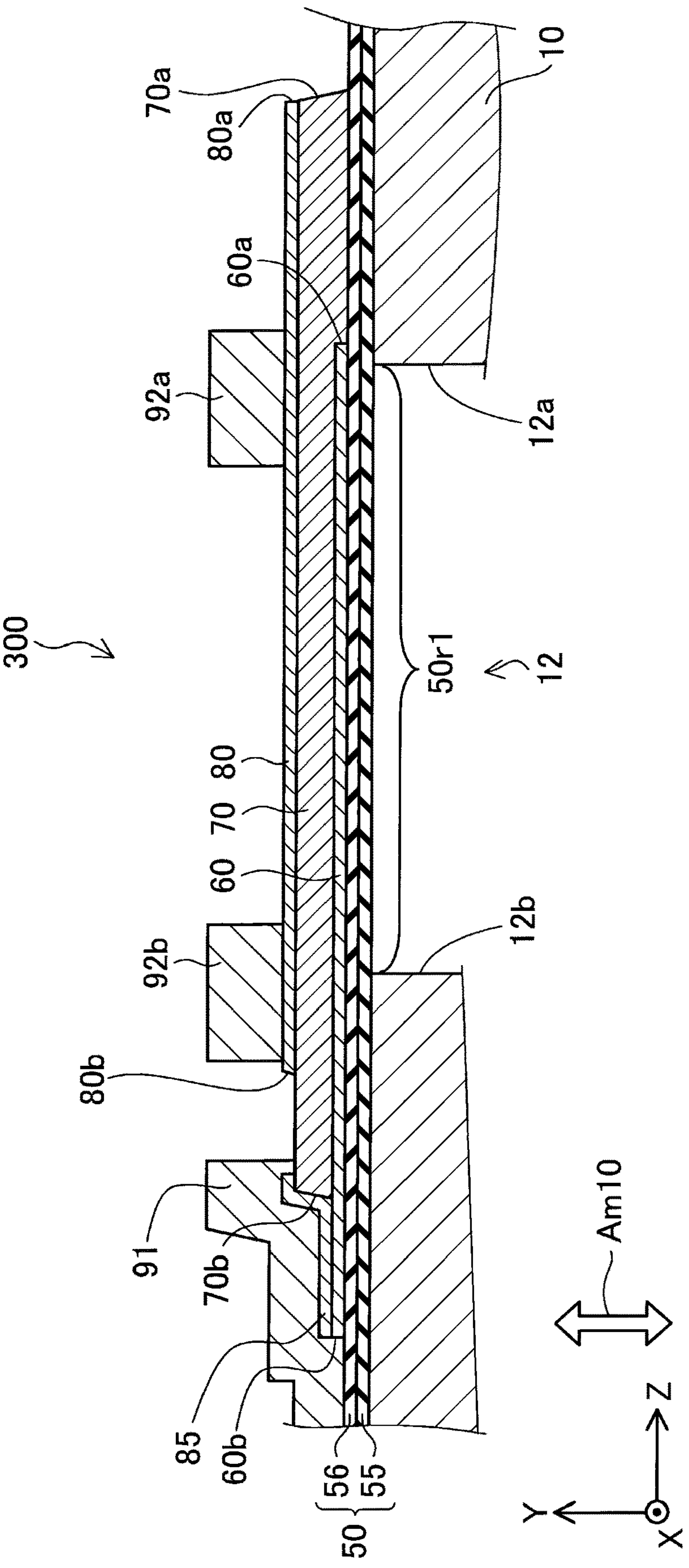
FIG. 5 is an enlarged cross-sectional view illustrating the vicinity of a piezoelectric element.
Figure 6:
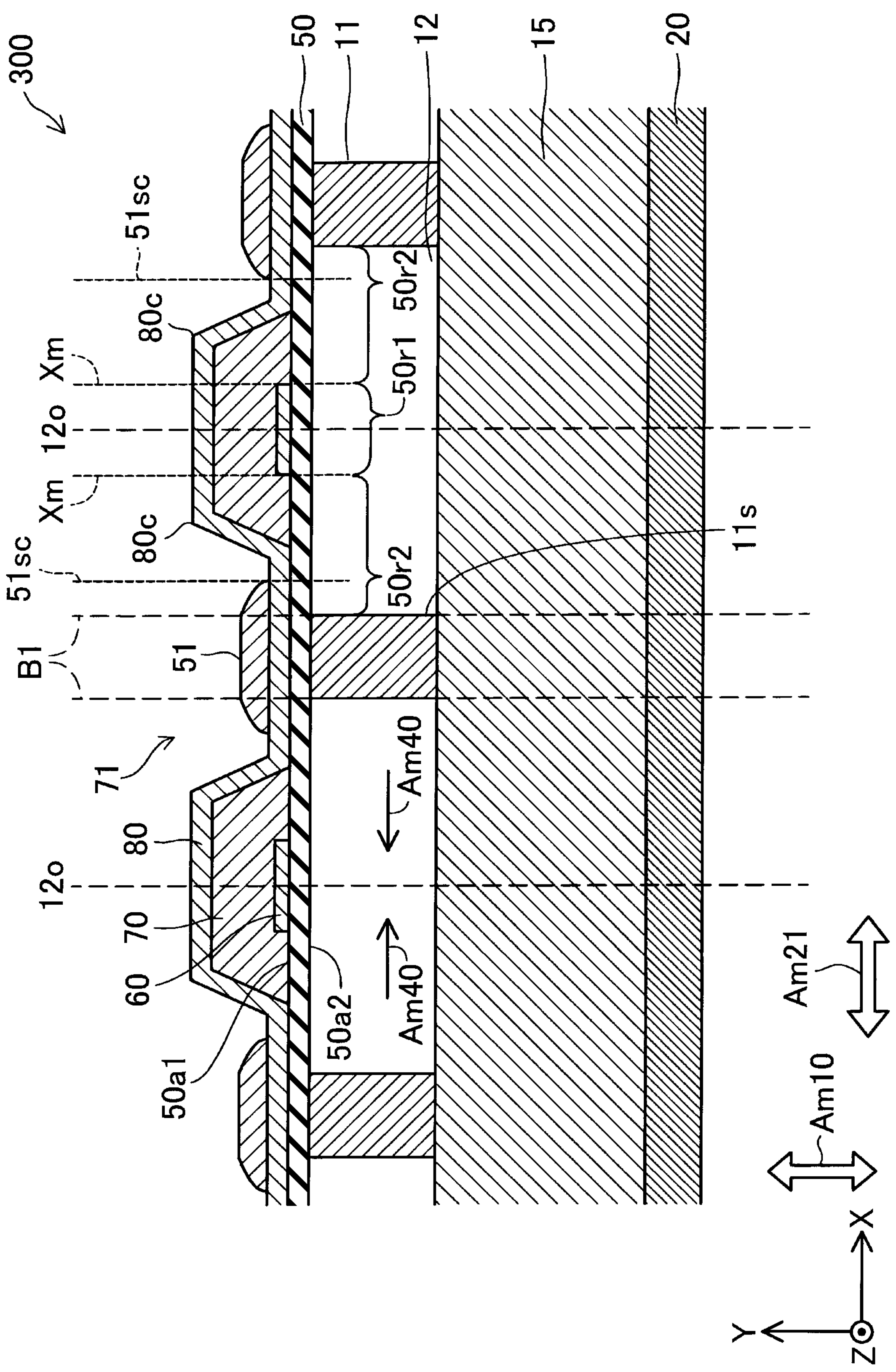
FIG. 6 is a cross-sectional view taken along line VI-VI in FIG. 3.

The configuration of the pressure chamber substrate 10 on the −Y direction side will be described with reference to FIGS. 3 to 6. FIG. 5 is an enlarged cross-sectional view illustrating the vicinity of the piezoelectric element 300. FIG. 6 is a cross-sectional view taken along line VI-VI in FIG. 3. The liquid ejecting head 510 includes, in addition to the diaphragm 50 and the piezoelectric element 300, a reinforcing film 51, an individual lead electrode 91, and a common lead electrode 92 on the −Y direction side of the pressure chamber substrate 10.

As illustrated in FIG. 5, the diaphragm 50 is vibrated in the lamination direction Am10 by driving the piezoelectric element 300, thus applying pressure to the liquid in the pressure chamber 12.

As illustrated in FIG. 6, a region of the diaphragm 50 where a first electrode 60, a piezoelectric layer 70, a second electrode 80, and the pressure chamber 12 overlap when viewed in the lamination direction Am10 is referred to as an active section **50*r*1. A region of the diaphragm 50, which is different from the active section 50*r*1 and where the pressure chambers 12 overlap when viewed in the lamination direction Am10 is referred to as a non-active section 50*r*2. In the lamination direction Am10, the surface of the diaphragm 50 to be described later on which the piezoelectric element 300 is provided is referred to as a first surface 50*a*1, and the surface thereof on which the pressure chamber substrate 10 is provided is referred to as a second surface 50*a*2 (see the upper left part of FIG. 6). Note that the direction from a boundary B1 to a center 12*o* of the pressure chamber 12** is referred to as a second direction Am40. The second direction Am40 is also a direction parallel to the X-axis direction.

As illustrated in FIG. 5, the diaphragm 50 is formed of an elastic film 55 made of silicon oxide provided on the pressure chamber substrate 10 side, and an insulating film 56 made of a zirconium oxide film. The −Y direction side surface of the flow path such as the pressure chamber 12 is formed of the elastic film 55. The pressure chamber 12 is formed by anisotropically etching the pressure chamber substrate 10 from the −Y direction side to the +Y direction. The elastic film 55 functions as a stop layer against the anisotropic etching. To facilitate understanding of the technology, the elastic film 55 and the insulating film 56 are omitted in the drawings other than FIG. 5.

The piezoelectric element 300 applies pressure to the pressure chamber 12 through the diaphragm 50. As illustrated in FIGS. 5 and 6, the piezoelectric element 300 includes the first electrode 60, the piezoelectric layer 70, and the second electrode 80. The first electrode 60, the piezoelectric layer 70, and the second electrode 80 are laminated in this order from the +Y direction side to the −Y direction side, as illustrated in FIGS. 5 and 6. The piezoelectric layer 70 is provided between the first electrode 60 and the second electrode 80 in the lamination direction Am10 in which the first electrode 60, the second electrode 80, and the piezoelectric layer 70 are laminated, that is, in the Y-axis direction.

As illustrated in FIG. 6, the reinforcing film 51 is formed along a direction perpendicular to the lamination direction Am10 so as to overlap the boundary B1 between a partition wall 11 and the pressure chamber 12 when viewed in the lamination direction Am10. A first direction Am20 is a direction including the Z-axis direction and the X-axis direction. The reinforcing film 51 will be described in detail later.

The first electrode 60 and the second electrode 80 are both electrically coupled to the wiring substrate 120 illustrated in FIG. 4. The first electrode 60 and the second electrode 80 apply a voltage to the piezoelectric layer 70 according to a drive signal. The first electrode 60 is supplied with a drive voltage that varies according to an ink ejection amount. The second electrode 80 is supplied with a constant reference voltage signal regardless of the ink ejection amount. The ink ejection amount is the amount of change in volume required for the pressure chamber 12. When the piezoelectric element 300 is driven, causing a potential difference between the first electrode 60 and the second electrode 80, the piezoelectric layer 70 is deformed. The deformation of the piezoelectric layer 70 deforms or vibrates the diaphragm 50, thus changing the volume of the pressure chamber 12. Such a change in volume of the pressure chamber 12 applies pressure to the ink contained in the pressure chamber 12, thus ejecting the ink from the nozzles 21 through the nozzle communication path 16.

As illustrated in FIG. 3, the first electrode 60 is an individual electrode provided individually for the plurality of pressure chambers 12. The first electrode 60 is made of platinum (Pt), for example. As illustrated in FIG. 6, a width of the first electrode 60 in the X-axis direction is narrower than a width of the pressure chamber 12. That is, both ends of the first electrode 60 in the X direction are located on the inner side of the pressure chamber 12 than both ends of the pressure chamber 12 in the X-axis direction. As illustrated in FIG. 5, an end portion **60*a* in the +Z direction and an end portion 60*b* in the Z direction of the first electrode 60 are disposed outside the pressure chamber 12, respectively. In the first pressure chamber array La, for example, the end portion 60*a* of the first electrode 60 is disposed at a position closer to the +Z direction side than an end portion 12*a* of the pressure chamber 12 in the +Z direction. The end portion 60*b* of the first electrode 60 is disposed at a position closer to the −Z direction side than an end portion 12*b* of the pressure chamber 12** in the −Z direction.

As illustrated in FIG. 5, a width of the piezoelectric layer 70 in the Z-axis direction is longer than a width of the pressure chamber 12 in the Z-axis direction, which is the longitudinal direction. As illustrated in FIG. 6, the piezoelectric layer 70 is provided extending along the arrangement direction Am21 of the pressure chambers 12, that is, the X-axis direction. Therefore, the piezoelectric layer 70 extends to the outside of the pressure chamber 12 on both sides of the pressure chamber 12 in the Z-axis direction. Examples of the piezoelectric layer 70 include a perovskite-structured crystal film, so-called perovskite-type crystal, which is formed on the first electrode 60 and made of a ferroelectric ceramic material exhibiting an electromechanical conversion effect. In this embodiment, lead zirconate titanate (PZT) is used as the piezoelectric layer 70.

As illustrated in FIG. 5, an end portion **70*a* of the piezoelectric layer 70 in the +Z direction is positioned on the +Z direction side, which is outside the end portion 60*a* of the first electrode 60, in the first pressure chamber array La. That is, the end portion 60*a* of the first electrode 60 is covered with the piezoelectric layer 70. An end portion 70*b* of the piezoelectric layer 70 in the −Z direction, on the other hand, is positioned on the +Z direction side, which is inside the end portion 60*b* of the first electrode 60. The end portion 60*b* of the first electrode 60 is not covered with the piezoelectric layer 70**.

As illustrated in FIG. 6, the piezoelectric layer 70 has a groove 71 formed between corners 80*c* of adjacent second electrodes 80 as a region where the piezoelectric layer 70 is not present. The groove 71 is provided at a position corresponding to each partition wall 11. The groove 71 is formed by completely removing the piezoelectric layer 70 in the Y-axis direction.

Figure 7:
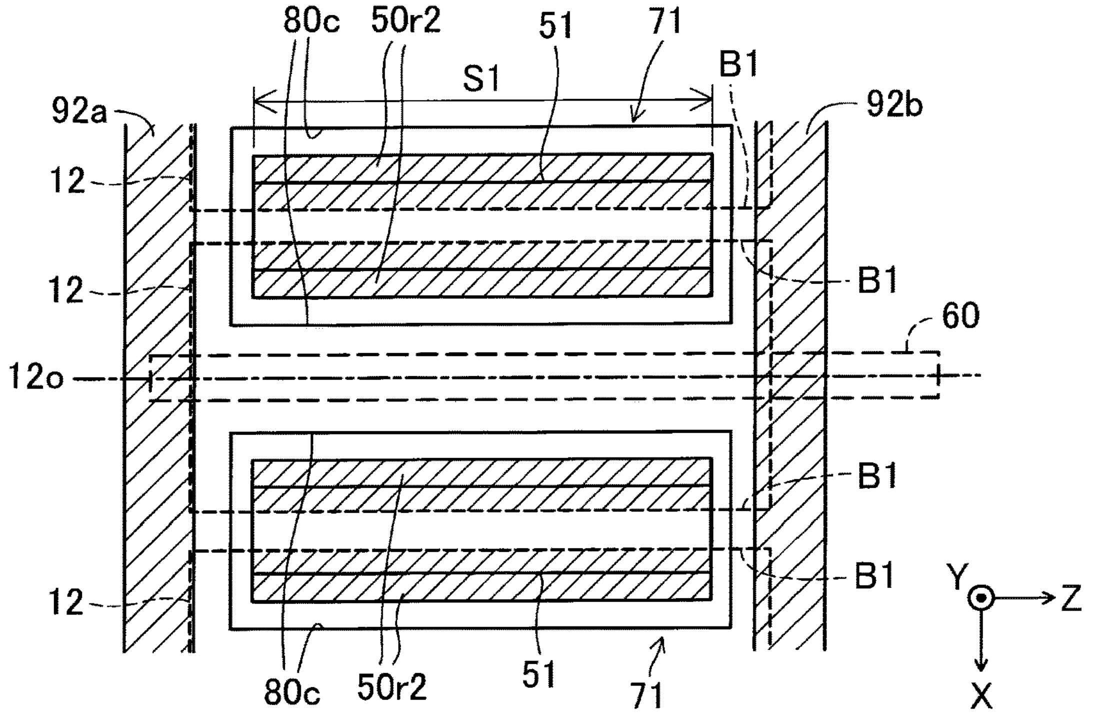
FIG. 7 is an enlarged plan view illustrating the vicinity of a groove section in FIG. 3.

FIG. 7 is an enlarged plan view illustrating the vicinity of the groove 71 in FIG. 3. FIG. 7 illustrates the groove 71 belonging to the second pressure chamber array Lb in FIG. 3. The groove 71 has a substantially rectangular external shape in plan view. A width of the groove 71 in the X-axis direction is wider than a width of the partition wall 11 in the X-axis direction. A width of the groove 71 in the Z-axis direction is narrower than the width of the pressure chamber 12 in the Z-axis direction. The groove 71 provided in the piezoelectric layer 70 suppresses the rigidity of portions of the diaphragm 50 facing the ends of the pressure chamber 12 in the X-axis direction, so-called arm sections of the diaphragm 50. The arm section of the diaphragm 50 corresponds to the non-active section 50*r*2. Therefore, the groove 71 enables better displacement of the piezoelectric element 300.

As illustrated in FIGS. 5 and 6, the second electrode 80 is provided on the side opposite to the first electrode 60 across the piezoelectric layer 70, that is, on the +Y direction side of the piezoelectric layer 70. As illustrated in FIG. 3, the second electrode 80 is a common electrode, which is provided in common for the plurality of pressure chambers 12 and is common to the plurality of active sections 50*r*1. In this embodiment, iridium (Ir) is used as the material for the second electrode 80.

As illustrated in FIG. 3, the second electrode 80 has a predetermined width in the Z-axis direction and is provided extending along the arrangement direction Am21 of the pressure chambers 12, that is, the X-axis direction. As illustrated in FIG. 6, the second electrode 80 is also provided on the side surface of the groove 71 in the piezoelectric layer 70 and on the diaphragm 50, which is the bottom surface of the groove 71.

As illustrated in FIG. 5, an end portion 80*a* of the second electrode 80 in the +Z direction is disposed outside the end portion 60*a* of the first electrode 60 covered with the piezoelectric layer 70, that is, on the +Z direction side. The end portion 80*a* of the second electrode 80 is positioned outside the end portion 12*a* of the pressure chamber 12 and outside the end portion 60*a* of the first electrode 60. In this embodiment, the end portion 80*a* of the second electrode 80 substantially coincides with the end portion 70*a* of the piezoelectric layer 70 in the Z-axis direction.

As illustrated in FIG. 5, an end portion 80*b* of the second electrode 80 in the −Z direction is positioned on the −Z direction side, which is outside the end portion 12*b* of the pressure chamber 12 in the −Z direction, and on the +Z direction side, which is inside the end portion 70*b* of the piezoelectric layer 70. The end portion 70*b* of the piezoelectric layer 70 is positioned inside the end portion 60*b* of the first electrode 60, which is on the +Z direction side. Therefore, the end portion 80*b* of the second electrode 80 is positioned on the piezoelectric layer 70 on the +Z direction side of the end portion 60*b* of the first electrode 60. On the −Z direction side of the end portion 80*b* of the second electrode 80, there is a portion where the surface of the piezoelectric layer 70 is exposed. The end portion 80*b* of the second electrode 80 is thus disposed on the +Z direction side of the end portion 70*b* of the piezoelectric layer 70 and the end portion 60*b* of the first electrode 60.

On the side of the end portion 80*b* of the second electrode 80, a wiring section 85 is provided, which is in the same layer as the second electrode 80 but is electrically discontinuous with the second electrode 80 (see the upper left part of FIG. 5). The wiring section 85 is formed from the vicinity of the end portion 70*b* of the piezoelectric layer 70 to the end portion 60*b* of the first electrode 60 with a space from the end portion 80*b* of the second electrode 80. The wiring section 85 is provided for each active section 50*r*1. That is, a plurality of wiring sections 85 are disposed at predetermined intervals along the X-axis direction.

As illustrated in FIGS. 3 and 5, the individual lead electrode 91 is coupled to the first electrode 60, which is an individual electrode, and the common lead electrode 92, which is a driving common electrode, is electrically coupled to the second electrode 80, which is a common electrode. The individual lead electrode 91 and the common lead electrode 92 function as drive wiring for applying a voltage to the piezoelectric layer 70 to drive the piezoelectric layer 70.

As illustrated in FIGS. 3 and 4, the individual lead electrode 91 and the common lead electrode 92 are provided extending so as to be exposed in the through-hole 32 formed in the protection substrate 30, and are electrically coupled to the wiring substrate 120 inside the through-hole 32. A plurality of wirings are formed on the wiring substrate 120 for coupling to a control unit 540 and a power supply circuit (not illustrated). In this embodiment, the wiring substrate 120 is configured using, for example, a flexible printed circuit (FPC).

An integrated circuit 121 having a switching element is mounted on the wiring substrate 120. A signal for driving the piezoelectric element 300 propagating on the wiring substrate 120 is inputted to the integrated circuit 121. The integrated circuit 121 controls the timing at which the signal for driving the piezoelectric element 300 is supplied to the first electrode 60, based on the inputted signal. Thus, the timing of driving the piezoelectric element 300 and the drive amount of the piezoelectric element 300 are controlled.

The material used for the individual lead electrode 91 and the common lead electrode 92 is gold (Au). The individual lead electrode 91 is provided for each active section 50*r*1, that is, for each first electrode 60. As illustrated in FIG. 5, in the first pressure chamber array La, for example, the individual lead electrode 91 is coupled to the vicinity of the end portion 60*b* of the first electrode 60 through the wiring section 85 and is extended in the −Z direction to above the diaphragm 50.

As illustrated in FIG. 3, in the first pressure chamber array La, for example, the common lead electrode 92 is bent at both ends in the X-axis direction and extended in the −Z direction from above the second electrode 80 to above the diaphragm 50. The common lead electrode 92 has an extended section 92*a* and an extended section 92*b*. As illustrated in FIG. 5, in the first pressure chamber array La, for example, the extended section 92*a* is extended along the X-axis direction in a region corresponding to the end portion 12*a* of the pressure chamber 12, and the extended section 92*b* is extended along the X-axis direction in a region corresponding to the end portion 12*b* of the pressure chamber 12. The extended section 92*a* and the extended section 92*b* are provided continuously in the X-axis direction with respect to the plurality of active sections 50*r*1. The extended section 92*a* and the extended section 92*b* are extended from the inside of the pressure chamber 12 to the outside of the pressure chamber 12 in the Z-axis direction.

Therefore, in the liquid ejecting head 510, the piezoelectric element 300 including the first electrode 60, the piezoelectric layer 70, and the second electrode 80, the diaphragm 50 that vibrates when the piezoelectric element 300 is driven, the reinforcing film 51, and the pressure chamber substrate 10 constituting the partition wall 11 that defines the pressure chamber 12 communicated with the nozzle 21, together with the diaphragm 50, are laminated in the lamination direction Am10, as illustrated in FIG. 4.

A2: Detailed Description of Reinforcing Film 51

The reinforcing film 51 reduces stress concentration by dispersing stress generated in the diaphragm 50. As illustrated in FIG. 6, the reinforcing film 51 is formed along a direction perpendicular to the lamination direction Am10 so as to overlap the boundary B1 between the partition wall 11 and the pressure chamber 12 when viewed in the lamination direction Am10. Overlapping the boundary B1 between the partition wall 11 and the pressure chamber 12 includes the case where the wall surface 11*s* of the partition wall 11 facing the pressure chamber 12 overlaps the pressure chamber 12 from its position in the X-axis direction. The reinforcing film 51 is not formed in the active section 50*r*1, but is formed in a part of the non-active section 50*r*2. The reinforcing film 51 is formed on the first surface 50*a*1 side of the diaphragm 50. The reinforcing film 51 is formed so as to be in contact with the second electrode 80 on the diaphragm 50. The reinforcing film 51 is formed in the X-axis direction from the position of the partition wall 11 to the position of the pressure chamber 12, straddling the boundary B1 therebetween.

As illustrated in FIG. 7, the reinforcing film 51 is formed in a rectangular shape elongated in the Z-axis direction within the range of the groove 71 so as to straddle the adjacent pressure chambers 12. Note that shaded areas in FIG. 7 indicate the non-active section 50*r*2 of the groove 71. Specifically, the reinforcing film 51 is formed at least in the center of the non-active section 50*r*2 in the Z-axis direction. The reinforcing film 51 is similarly formed in each of the plurality of grooves 71. Furthermore, a length Si of the reinforcing film 51 in the Z-axis direction is not continuous with the common lead electrode 92, or is set within the range of the piezoelectric element 300. Note that the reinforcing film 51 may be disposed so as to correspond to the entire non-active section 50*r*2 in the Z-axis direction.

Figure 8:
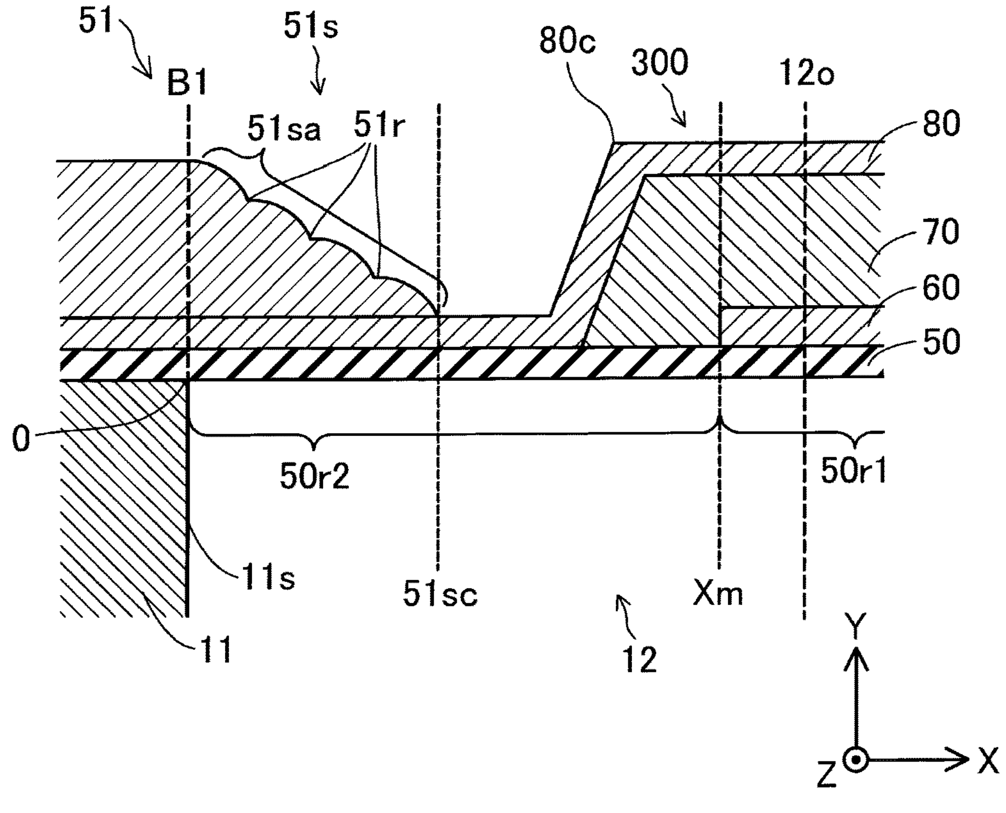
FIG. 8 is an enlarged cross-sectional view illustrating the vicinity of a reinforcing film in FIG. 6.
Figure 9:
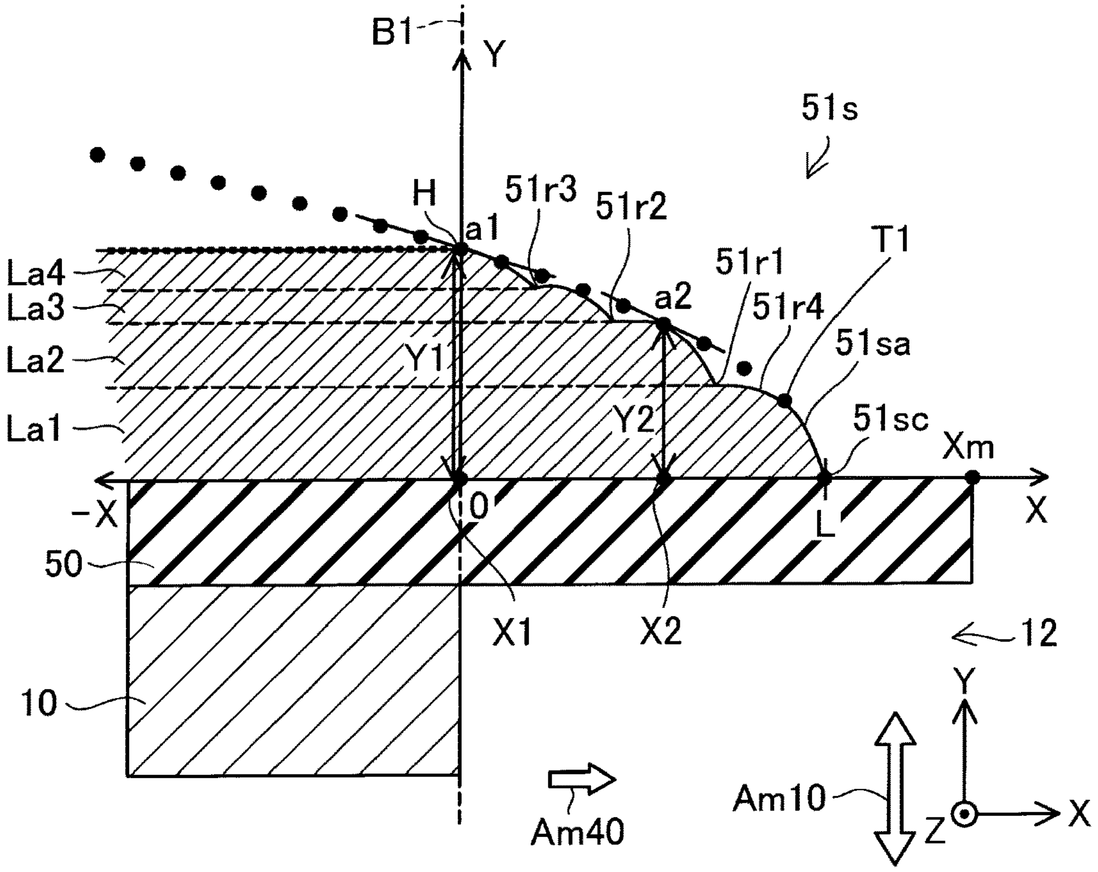
FIG. 9 is a cross-sectional view illustrating a cross-sectional shape of the reinforcing film.

FIG. 8 is an enlarged cross-sectional view around the reinforcing film 51 in FIG. 6. FIG. 9 is a cross-sectional view illustrating the cross-sectional shape of the reinforcing film 51. FIGS. 8 and 9 illustrate the cross section parallel to the lamination direction Am10 and the second direction Am40 from the boundary B1 to the center 12*o* of the pressure chamber 12 among the directions perpendicular to the lamination direction Am10. On the diaphragm 50, the end of the active section 50*r*1 in the X-axis direction is referred to as a position Xm. On the diaphragm 50, the end of the reinforcing film 51 in the X-axis direction is referred to as a tip 51*sc*. Here, the tip 51*sc* overlaps the non-active section 50*r*2. In FIG. 9, the origin 0 is the intersection of the first surface 50*a*1 of the diaphragm 50 and the boundary B1. Furthermore, in FIG. 9, the second electrode 80 in the non-active section 50*r*2 can be considered as substantially a part of the diaphragm 50, and therefore is not illustrated. In the reinforcing film 51, a portion above the pressure chamber 12 in the +X direction from the origin 0 is referred to as an end portion 51*s*.

Figure 10:
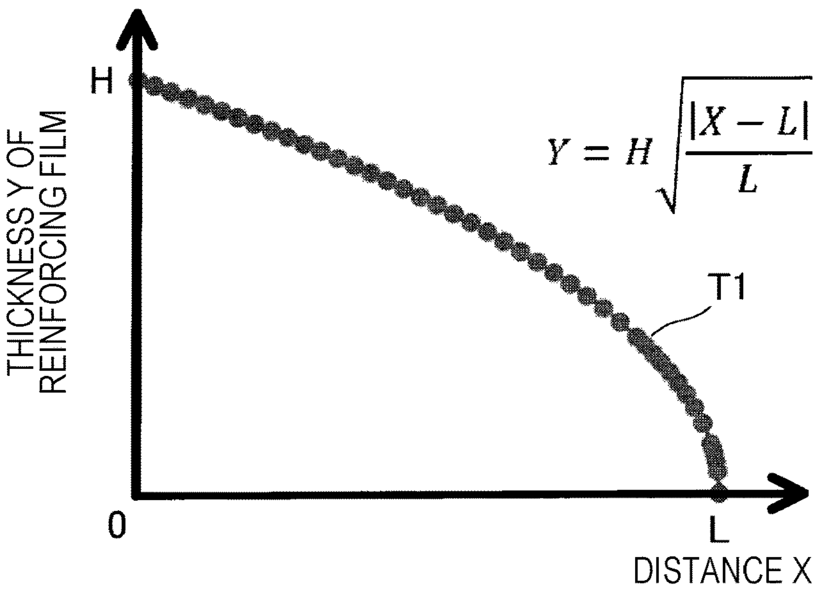
FIG. 10 is an explanatory diagram illustrating a curve defining a thickness of an end portion of the reinforcing film.

FIG. 10 is an explanatory diagram illustrating a curve defining a thickness Y of the end portion 51*s* of the reinforcing film 51. FIG. 10 illustrates a trajectory T1 of the thickness Y calculated by Formula (3). The XY coordinates in FIG. 10 correspond to the XY coordinates in FIG. 9. That is, the trajectory T1 in FIG. 9 is illustrated based on Formula (3). As illustrated in FIG. 9, the end portion 51*s* has its thickness Y defined along the trajectory T1. According to Formula (3), where L is a first distance between the boundary B1 and the end portion 51*s* of the reinforcing film 51 closest to the center 12*o* of the pressure chamber 12 in the direction from the boundary B1 to the center 12*o* of the pressure chamber 12 with the origin 0, and H is the thickness of the reinforcing film 51 at the origin 0, the thickness Y of the reinforcing film 51 at an arbitrary distance X is determined as follows. In FIG. 9, the end portion 51*s* of the reinforcing film 51 closest to the boundary B1 and the center 12*o* of the pressure chamber 12 is the tip 51*sc*.

$$Y = H\sqrt{\frac{|X - L|}{L}} \tag{3}$$

Formula (3) is obtained by assuming that the end portion 51*s* is a cantilever with the boundary B1 in the −Y direction as a fixed end and the tip 51*sc* as a free end. The thickness Y of the end portion 51*s* defined by Formula (3) achieves uniform bending moment from the tip 51*sc* of the reinforcing film 51 to the boundary B1 when the width Si is constant in the Z-axis direction in FIG. 7. That is, the thickness Y is calculated so that the section modulus from the tip 51*sc* to the boundary B1 increases. Such a cantilever is also called a cantilever of equal strength.

Therefore, the thickness Y of the reinforcing film 51 in the lamination direction Am10 decreases in the second direction Am40 from the boundary B1 to the center 12*o* of the pressure chamber 12.

The end portion 51*s* of the reinforcing film 51 is formed based on the trajectory T1 so as to further satisfy the conditions of Formulas (1) and (2) below. On the diaphragm 50, a first thickness of the reinforcing film 51 in the lamination direction Am10 at a first position X1 as the position of the boundary B1 is defined as Y1, and a second thickness of the reinforcing film 51 in the lamination direction Am10 at a second position X2 closer to the center 12*o* of the pressure chamber 12 than the first position X1 is defined as Y2. Note that the center 12*o* of the pressure chamber 12 is the center of the width of the pressure chamber 12 at the longest straight portion of both side surfaces located at the boundary B1. Therefore, in the pressure chamber 12, the opposite side surfaces located at the boundary B1 may have portions that are not parallel to each other. The second position X2 is the position at the second thickness Y2 that reaches the trajectory T1. Furthermore, the absolute value of the slope of a tangent line a to an inclined surface 51*sa*, which is the surface of the reinforcing film 51 that is not in contact with the diaphragm 50, is defined. Specifically, when the absolute value of the slope of a first tangent line at the first position X1 is a1, and the absolute value of the slope of a second tangent line at the second position X2 is a2, the end portion 51*s* of the reinforcing film 51 satisfies the conditions of Formulas (1) and (2).

$$Y1 > Y2 \quad (1)$$

$$0 < a1 < a2 \quad (2)$$

As for the inclined surface 51*sa*, the surface of the reinforcing film 51 that is not in contact with the diaphragm 50 is, more specifically, the surface that is not in contact with a portion that is substantially considered as the diaphragm 50. As described above, the second electrode 80 in the non-active section 50*r*2 is substantially considered as the diaphragm 50. Therefore, in the first embodiment, the surface of the reinforcing film 51 that is not in contact with the diaphragm 50 is the surface of the reinforcing film 51 that is not in contact with the second electrode 80 in the non-active section 50*r*2.

The reinforcing film 51 is made of a material having a lower Young's modulus than that of the diaphragm 50. For example, when the zirconium oxide of the diaphragm 50 has a Young's modulus of 200 GPa, the reinforcing film 51 is made of an organic material having a Young's modulus of 2.7 GPa. In the case of this configuration, the thickness H of the reinforcing film 51 is set to a thickness Y that is 2.5 times the thickness Y of the diaphragm 50 in this embodiment.

The reinforcing film 51 is formed by laminating an organic material on the diaphragm 50. The silicon oxide layer is formed by laminating layers La1 to La4, for example, as illustrated in FIG. 9. Furthermore, as for the silicon oxide layer, the higher the layer, the shorter the length in the X-axis direction. That is, the positions of both ends of each of the layers La1 to La4 vary in the X-axis direction. Therefore, in the end portion 51*s* of the reinforcing film 51, recesses 51*r*1 to 51*r*3 are formed between each of the layers La1 to La4. The recesses 51*r*1 to 51*r*3 are also collectively referred to as the recess 51*r*. The recesses 51*r* are each formed such that the further away in the +Y direction, the deeper on the boundary B1 side. Specifically, each layer of the reinforcing film 51 is formed such that the higher the layer, the smaller the width in the X-axis direction. Therefore, the thickness Y of the end portion 51*s* of the reinforcing film 51 decreases as it gets closer to the piezoelectric element 300.

In each of the layers La1 to La4, the corner located at the end portion 51*s* of the reinforcing film 51 is chamfered. FIG. 9 illustrates a corner 51*r*4 of the layer La1. Specifically, the corner located at the end portion 51*s* of the reinforcing film 51 is a convex portion that protrudes from the reinforcing film 51 from the origin 0, which is the boundary B1, to the tip 51*sc* of the reinforcing film 51. The corner of the end portion 51*s* of the reinforcing film 51 is formed by removing the corners of each layer by anisotropic etching, for example. Therefore, the end portion 51*s* of the reinforcing film 51 is formed more closely to the trajectory T1 than in the case where it is not chamfered.

In actual manufacturing, the reinforcing film 51 is formed by laminating materials as described above. Therefore, the recess 51*r* is formed at the end portion 51*s* of the reinforcing film 51. Specifically, by setting the conditions of Formulas (1) and (2), the reinforcing film 51 having unevenness can be easily formed in accordance with the actual manufacturing capacity compared to the case where it is formed according to the trajectory T1.

A3: Dispersion of Stress by Reinforcing Film 51

The stress generated in the diaphragm 50 by the reinforcing film 51 according to the present disclosure will be described. To relatively evaluate the stress generated in the diaphragm 50, three types of analysis targets are used: a first comparative example, a second comparative example, and an embodiment of the present disclosure. Structural analysis using a finite element method is used to calculate the stress generated in the diaphragm 50. In structural analysis using the finite element method, it is necessary to set a physical property value of the material, support conditions, load conditions, mesh size, and the like, in addition to the shape of the analysis target. As described above, the Young's modulus as the physical property value of the material is 200 Gpa for the diaphragm 50 and 2.7 GPa for the reinforcing film 51. The support condition is that the partition wall 11 is fixed. The load condition is that a concentrated load F in the +Y direction is applied at the position Xm. However, the concentrated load F is not the same value for the three types of analysis targets described below. The concentrated load F is set so that the displacement amount U at the position Xm takes a constant value. The displacement amount U will be described later. The mesh size is experimentally set depending on the size of the analysis target and stress distribution. As the three types of analysis targets, the diaphragm 50 will be described below.

Figure 11:
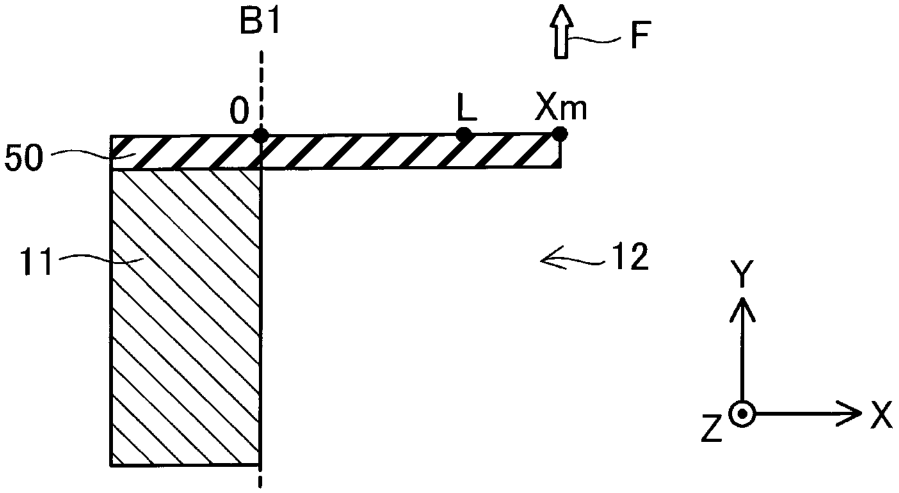
FIG. 11 is an explanatory diagram illustrating a cross section of a diaphragm before displacement.

FIG. 11 is an explanatory diagram illustrating a cross section of a diaphragm 50 before displacement according to the first comparative example. In the first comparative example illustrated in FIG. 11, only the diaphragm 50, the partition wall 11, and the pressure chamber 12 are illustrated, without the reinforcing film 51 illustrated in FIG. 8. In the first comparative example of FIG. 11, the illustration of the XY coordinates, the trajectory T1, and the like is omitted to facilitate understanding of the technology. The same applies to the drawings to be described later.

In the first comparative example of FIG. 11, the diaphragm 50 is in a state before receiving the concentrated load F due to pressure in the +Y direction. Specifically, when the liquid ejecting head 510 ejects ink, pressure is generated in the +Y direction as the ink in the pressure chambers 12 flows due to pressure fluctuations in the plurality of pressure chambers 12. As for the position and direction of the concentrated load F, the same applies to the drawings to be described later.

Figure 12:
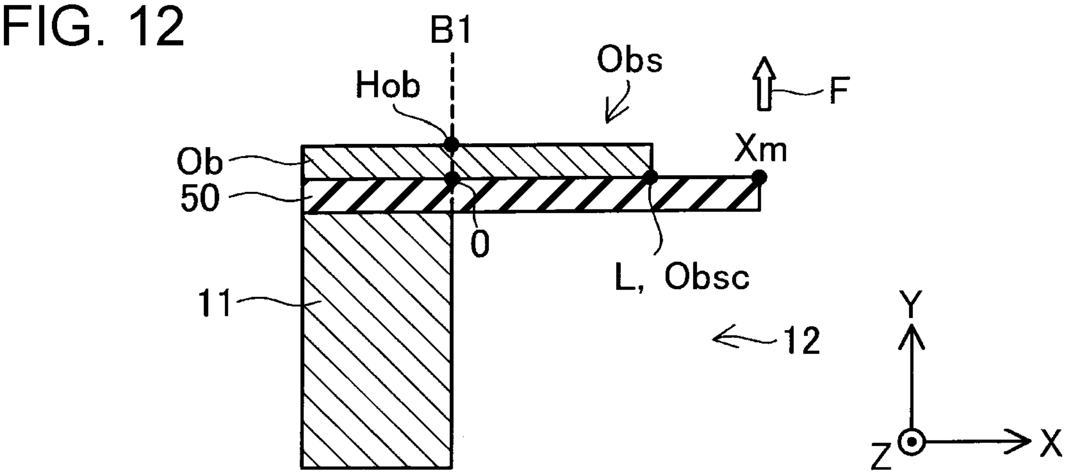
FIG. 12 is an explanatory diagram illustrating a cross section of a reinforcing film and the diaphragm before displacement.

FIG. 12 is an explanatory diagram illustrating a cross section of a reinforcing film Ob and a diaphragm 50 before displacement according to the second comparative example. In the second comparative example of FIG. 12, the diaphragm 50 including the reinforcing film Ob is illustrated as a comparison target with the reinforcing film 51 according to the present disclosure. The reinforcing film Ob has an end portion Obs as the end portion 51*s* of the reinforcing film 51. As illustrated in the second comparative example of FIG. 12, the end portion Obs is formed to have a single-layer rectangular cross-sectional shape. The thickness Y of the end portion Obs is a constant thickness Hob from the origin 0, which is the boundary B1, to the tip Obsc of the reinforcing film 51. That is, the thickness Y of the end portion Obs is not formed along the trajectory T1 according to Formula (3).

Figure 13:
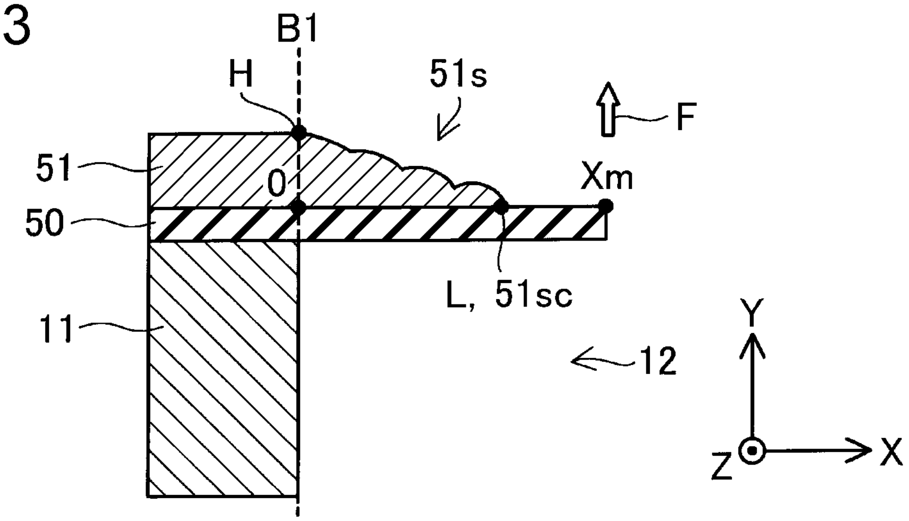
FIG. 13 is an explanatory diagram illustrating a cross section of a reinforcing film and the diaphragm before displacement.

FIG. 13 is an explanatory diagram illustrating a cross section of the reinforcing film 51 and the diaphragm 50 before displacement according to the embodiment of the present disclosure. In the embodiment of the present disclosure illustrated in FIG. 13, the reinforcing film 51 is illustrated without the XY coordinates and some of the illustration in FIG. 8.

Figure 14:
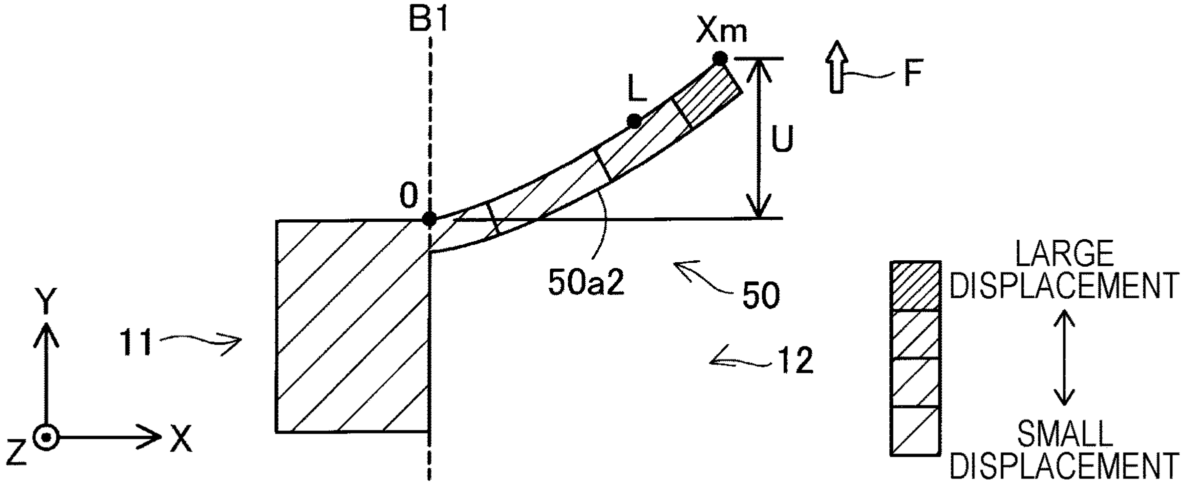
FIG. 14 is an explanatory diagram illustrating a cross section of the diaphragm after displacement.

FIG. 14 is an explanatory diagram illustrating a cross section of the diaphragm 50 after displacement according to the first comparative example. In the first comparative example of FIG. 14, the position Xm in FIG. 11 is displaced by a displacement amount U in the +Y direction. In the first comparative example of FIG. 14, the displacement amount U of each part is schematically illustrated by coloring the displacement amount U in four levels based on the actual analysis result. That is, in the first comparative example of FIG. 14, the darker the color, the larger the displacement amount. However, in similar drawings, such as FIGS. 14 to 16, the scale of the displacement amount is different. Therefore, the displacement amount may be different even though the colors are the same. As illustrated in FIG. 14, the diaphragm 50 is curved state at the boundary B1 so as to reach the maximum displacement amount U at the position Xm.

Figure 15:
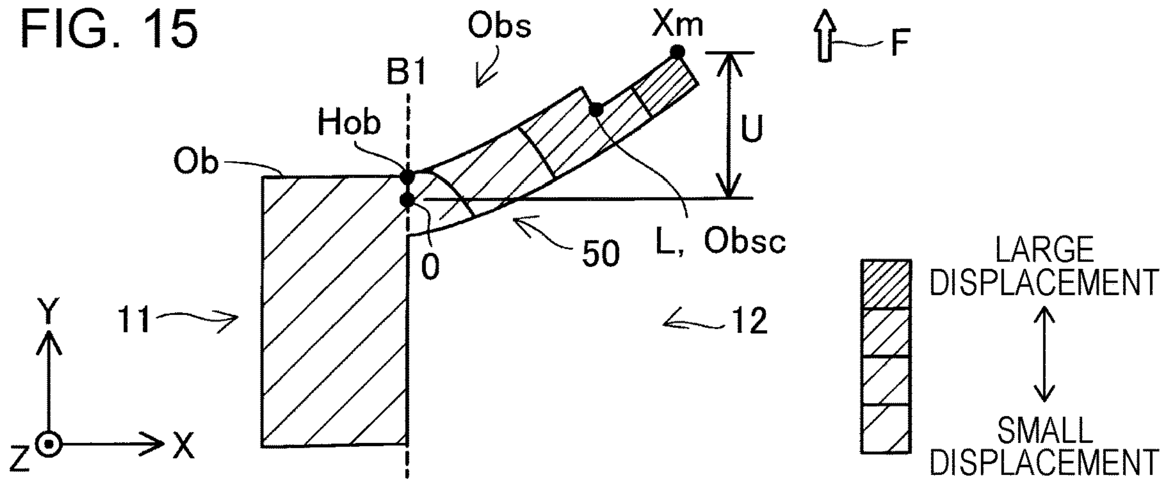
FIG. 15 is an explanatory diagram illustrating a cross section of the reinforcing film and the diaphragm after displacement.
Figure 16:
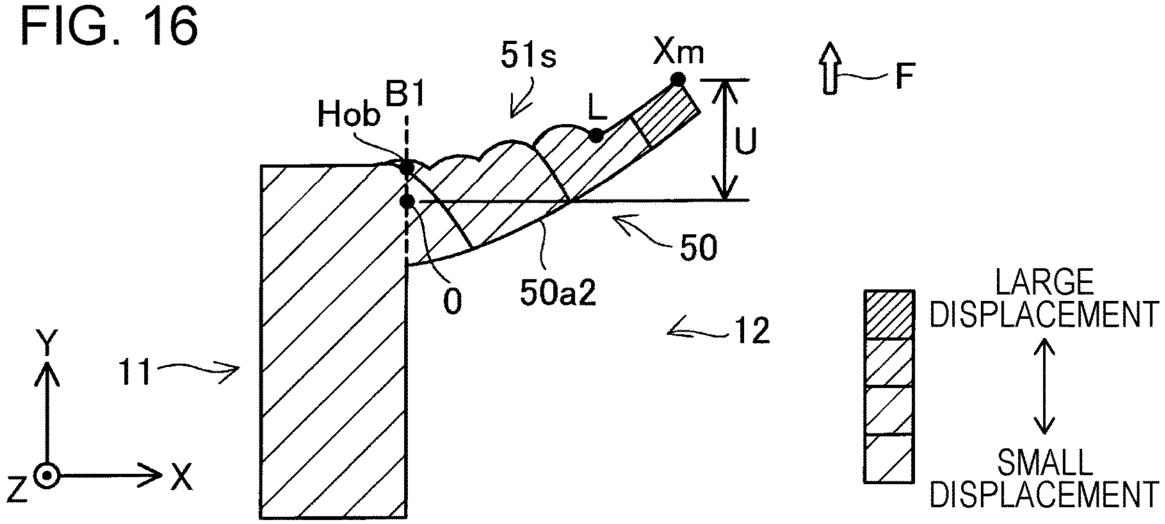
FIG. 16 is an explanatory diagram illustrating a cross section of the reinforcing film and the diaphragm after displacement.

FIG. 15 is an explanatory diagram illustrating a cross section of the reinforcing film Ob and the diaphragm 50 after displacement according to the second comparative example. FIG. 16 is an explanatory diagram illustrating a cross section of the reinforcing film 51 and the diaphragm 50 after displacement according to the embodiment of the present disclosure. In the second comparative example of FIG. 15 and the embodiment of the present disclosure of FIG. 16, again, the position Xm is displaced by the displacement amount U in the Y direction, as in the first comparative example of FIG. 14. The stress on the diaphragm 50 in the states of FIGS. 14 to 16 will be described below.

Figure 17:
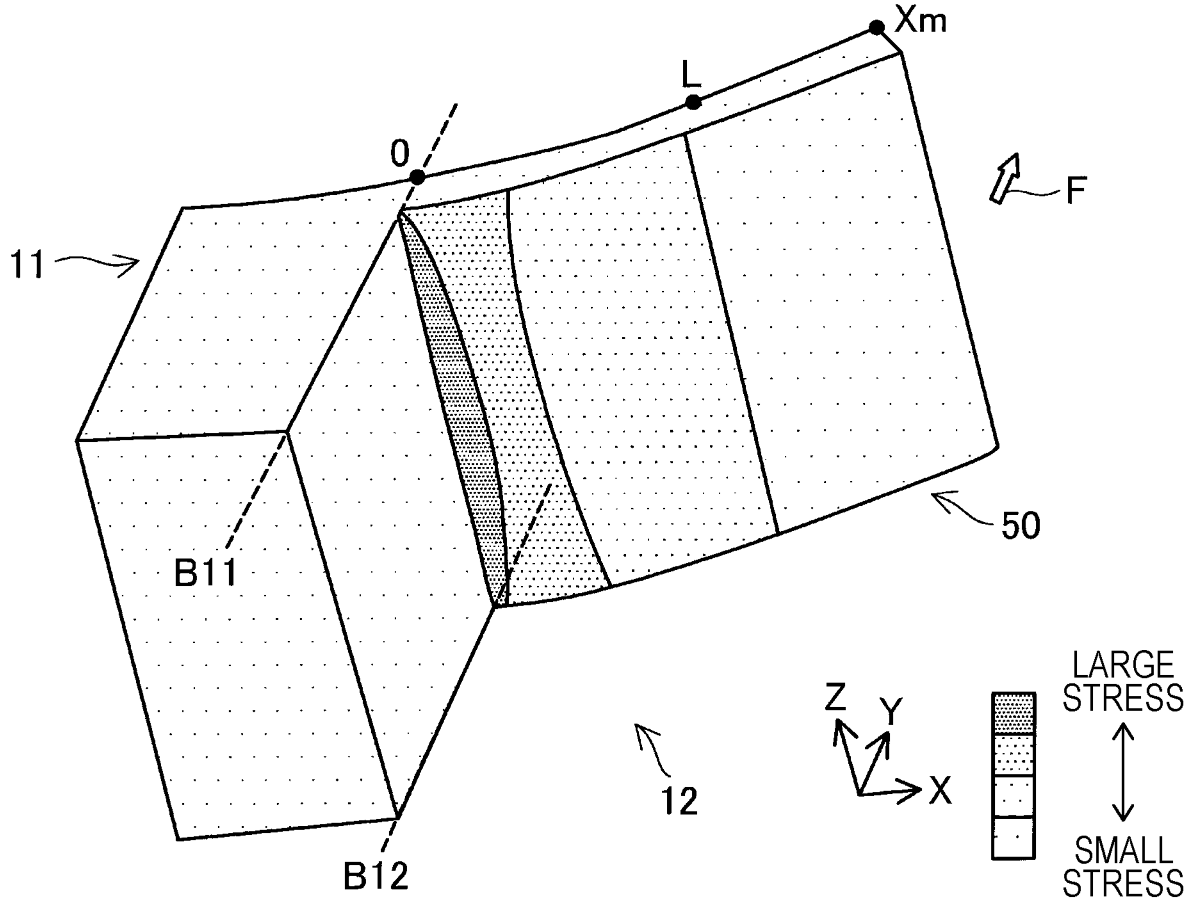
FIG. 17 is a perspective view of the diaphragm after displacement.

FIG. 17 is a perspective view of the diaphragm 50 after displacement according to the first comparative example. In the first comparative example of FIG. 17, a perspective view of the boundary B1 seen from inside the pressure chamber 12 is illustrated to show the stress at the boundary B1 between the diaphragm 50 and the partition wall 11. In the first comparative example of FIG. 17, the stress in each part is schematically illustrated by coloring the maximum stress degree in four levels, based on the actual analysis result. As for the stress in each part, the same applies to the second comparative example of FIG. 18 and the embodiment of the present disclosure of FIG. 19, which will be described later. Therefore, the stress dispersion can be relatively compared, based on the spread of colors in each part. In the first comparative example of FIG. 17, the darker the color, the larger the displacement amount. A boundary B11 and a boundary B12 indicate ends in the Z-axis direction on the boundary B1 in FIG. 17. The boundary B11 is the end located further in the +Z direction, relative to the boundary B12.

Figure 18:
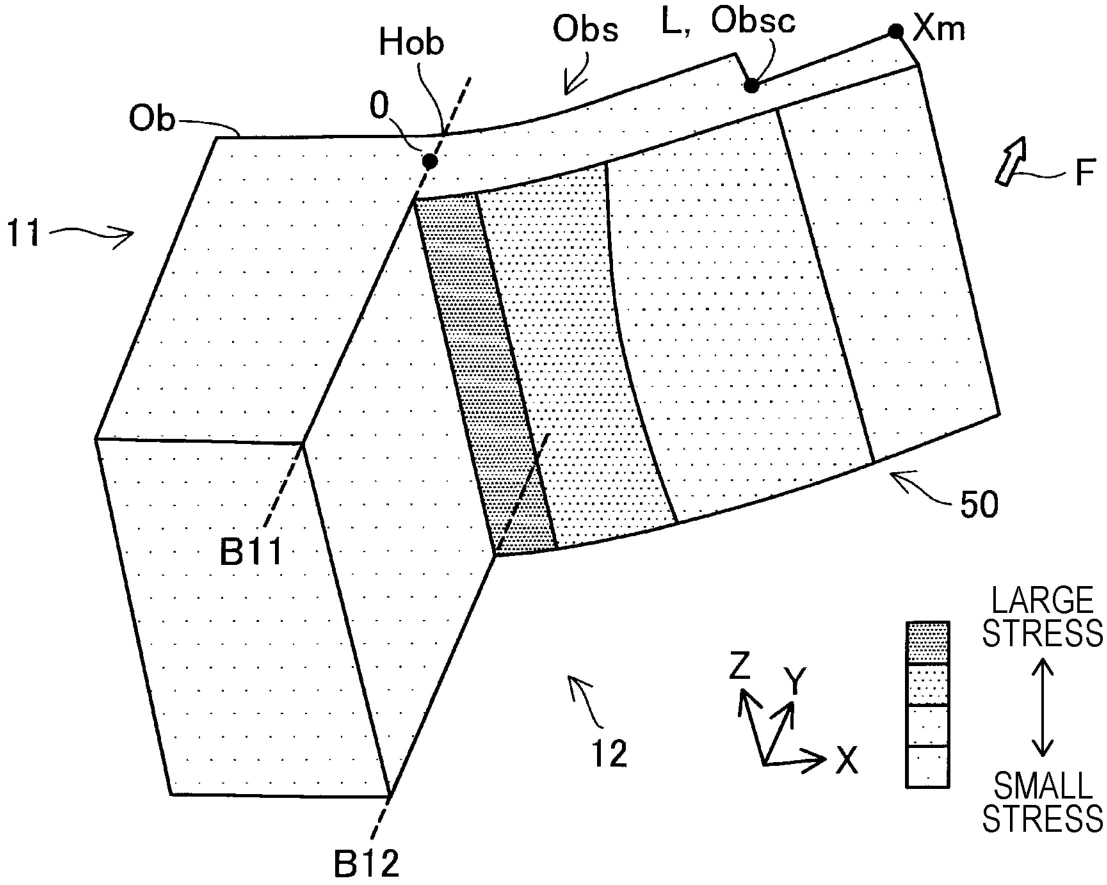
FIG. 18 is a perspective view of the reinforcing film and the diaphragm after displacement.
Figure 19:
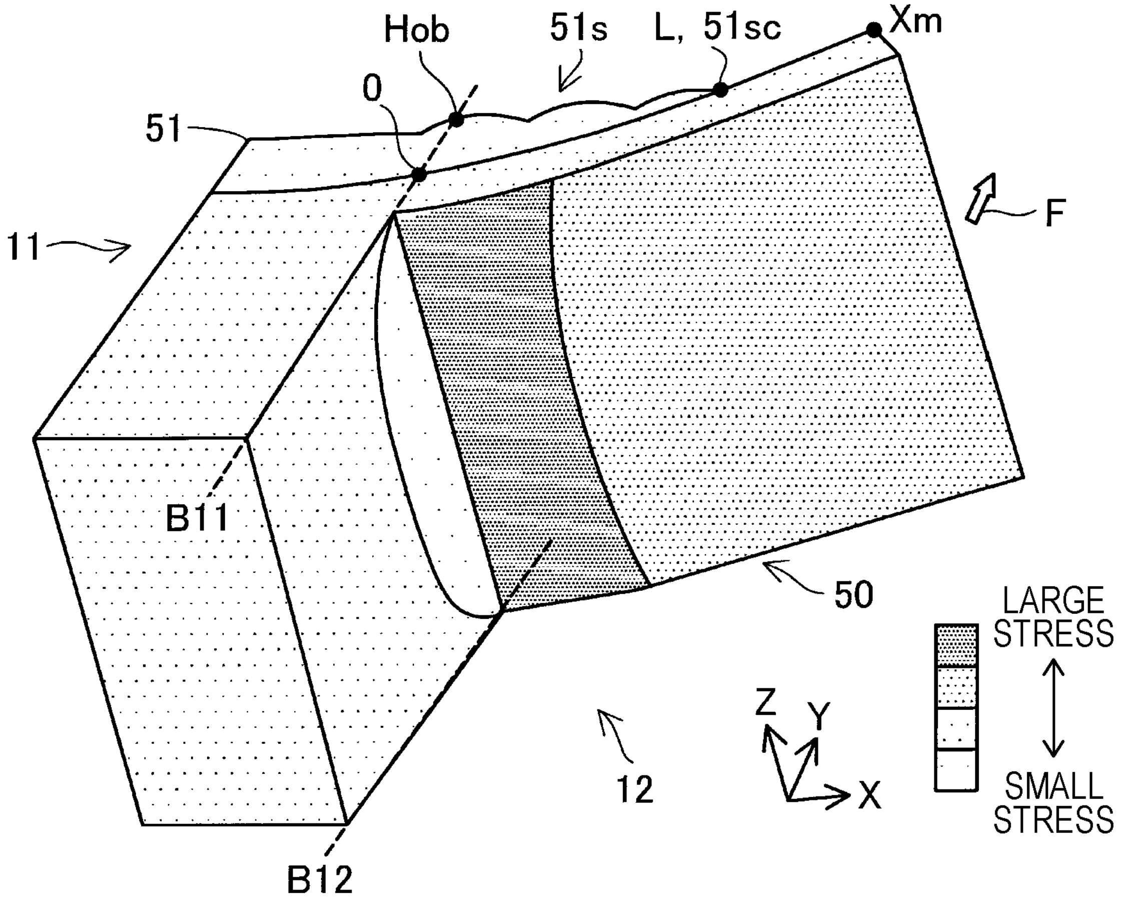
FIG. 19 is a perspective view of the reinforcing film and the diaphragm after displacement.

FIG. 18 is a perspective view of the reinforcing film Ob and the diaphragm 50 after displacement according to the second comparative example. FIG. 19 is a perspective view of the reinforcing film 51 and the diaphragm 50 after displacement according to the embodiment of the present disclosure. As illustrated in FIGS. 17 to 19, the largest stress distribution among the four stress levels occurs near the partition wall 11 between the boundary B11 and the boundary B12 in the diaphragm 50. That is, since the diaphragm 50 receives the concentrated load F with the boundary B1 as the fixed end, the stress is concentrated at the boundary B1 that does not move. In the second comparative example of FIG. 18, on the other hand, the diaphragm 50 including the reinforcing film Ob has a wider distribution of the largest stress than the diaphragm 50 in the first comparative example of FIG. 17. In the embodiment of the present disclosure of FIG. 19, the diaphragm 50 including the reinforcing film 51 has an even wider distribution of the largest stress than the diaphragm 50 including the reinforcing film Ob. Since the reinforcing film Ob has the constant thickness Y from the boundary B1 to the tip Obsc, the section modulus is also constant. On the other hand, the reinforcing film 51 has such a section modulus as to obtain uniform bending moment from the boundary B1 to the tip 51*sc*. Therefore, the reinforcing film 51 can further disperse the stress concentration around the boundary B1, compared to the shape having the constant thickness Y such as the reinforcing film Ob.

More specifically, the shape of the second surface 50*a*2, which is bent under the concentrated load F, is straight in the reinforcing film 51 according to the first comparative example of FIG. 14, and the stress is concentrated at the root of the beam. In the reinforcing film 51 according to the embodiment of the present disclosure of FIG. 16, on the other hand, the shape of the second surface 50*a*2 bent under the concentrated load F is close to an arc, and the stress is distributed more evenly.

With such a configuration, the reinforcing film 51 of the present disclosure is formed on the diaphragm 50 so as to overlap at the first position X1, which is the boundary B1 between the partition wall 11 and the pressure chamber 12, when viewed in the lamination direction Am10. The reinforcing film 51 is formed to have the thickness Y that decreases from the boundary B1 to the second position X2 closer to the center 12*o* of the pressure chamber 12. The thickness Y deceases more sharply at the second position X2 than the first position X1. This can reduce the possibility of stress being concentrated at one point in the direction from the boundary B1 to the center 12*o* of the pressure chamber 12. That is, the possibility of cracks occurring in the diaphragm 50 can be reduced.

The reinforcing film 51 provided in the non-active section 50*r*2 makes it possible to reinforce the non-active section 50*r*2, where stress is generated by the vibration of the active section 50*r*1, without significantly inhibiting the vibration of the active section 50*r*1.

Moreover, the reinforcing film 51 is formed on the first surface 50*a*1 outside the pressure chamber 12, which is a part of the flow path. The second surface 50*a*2 on which the pressure chamber substrate 10 is provided is a surface that defines the space of the pressure chamber 12, and is therefore positioned inside the flow path. Therefore, the reinforcing film 51 is easily formed on the first surface 50*a*1 having less influence on the surroundings of the reinforcing film 51, compared to the case where the reinforcing film 51 is formed on the second surface 50*a*2.

B. Second Embodiment

Figure 20:
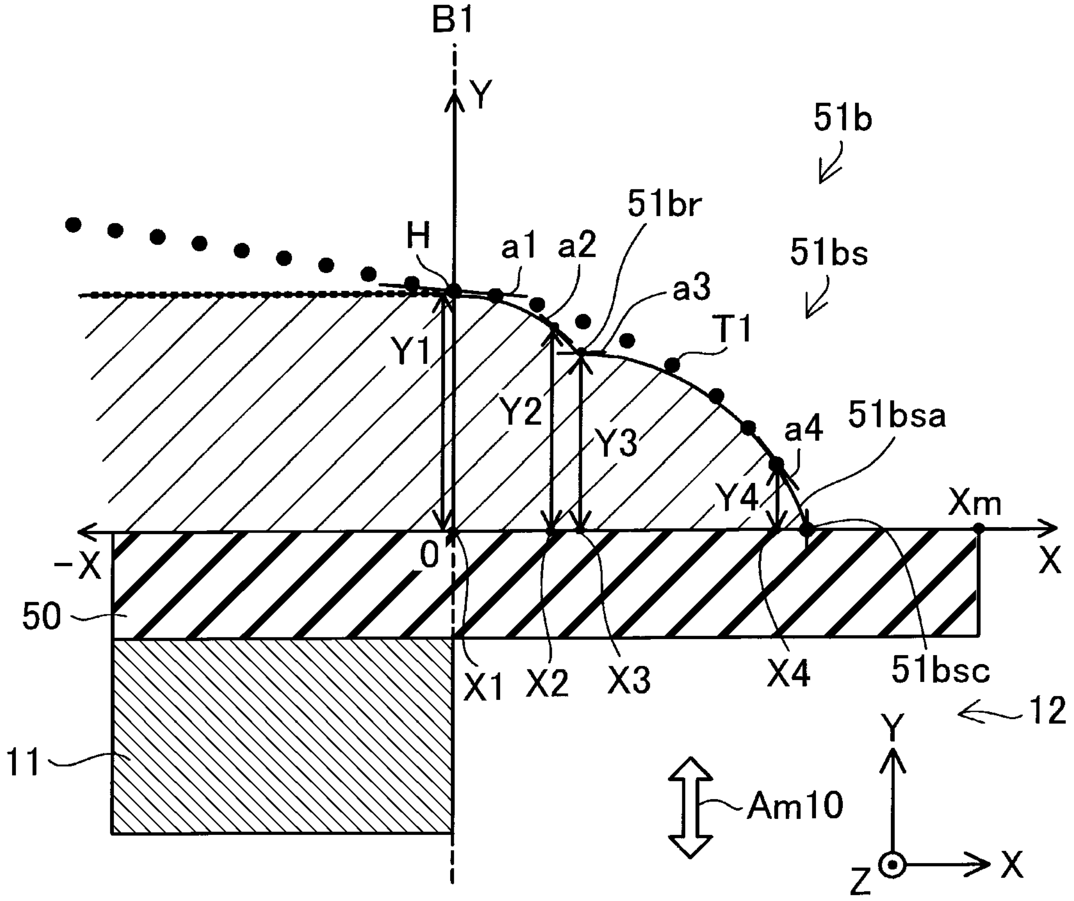
FIG. 20 is a cross-sectional view illustrating a cross-sectional shape of the reinforcing film.

FIG. 20 is a cross-sectional view illustrating a cross-sectional shape of a reinforcing film 51*b*. The reinforcing film 51*b* according to a second embodiment corresponds to the reinforcing film 51 according to the first embodiment. The reinforcing film 51*b* has a thickness Y that decreases as it gets closer to the piezoelectric element 300, and is provided with a recess 51*r* formed by a step of the thickness Y on an inclined surface 51*bsa*. The reinforcing film 51*b* includes one or more recesses 51*r*. The reinforcing film 51*b* has a tangent line a and the thickness Y defined for each recess 51*r* between a boundary B and a tip 51*bsc* of the reinforcing film 51*b*. In the following description, to facilitate understanding of the technology, a case where there is one recess 51*r* as illustrated in FIG. 20 will be described. The other points in the liquid ejecting head 510 other than the reinforcing film 51*b* are the same as in the first embodiment.

In the cross section of FIG. 20, the recess 51*br* is positioned closer to the center 12*o* of the pressure chamber 12 than the second position X2. The reinforcing film 51*b* is defined by the relationship of Formulas (1) and (2) according to the first embodiment, in the section from the boundary B1 to the recess 51*br*. The reinforcing film 51*b* also has a third thickness Y3 of the reinforcing film 51*b* in the lamination direction Am10 at a third position X3 as the position of the recess 51*br*, and a fourth thickness Y4 of the reinforcing film 51*b* in the lamination direction Am10 at a fourth position X4 closer to the center 12*o* of the pressure chamber 12 than the recess 51*br*. The reinforcing film 51*b* satisfies Formulas (4), (5), and (6) below, where a3 is the absolute value of the slope of a third tangent line at the third position X3 and a4 is the absolute value of the slope of a fourth tangent line at the fourth position X4, as with the tangent line a described above.

$$Y1 > Y2 > Y3 > Y4 \quad (4)$$

$$a3 < a2 \quad (5)$$

$$0 < a3 < a4 \quad (6)$$

When the number of recesses 51*br* in the reinforcing film 51*b* is two or more, the tangent line a and the thickness Y are newly defined for each recess 51*br* at positions corresponding to the third position X3 and the fourth position X4. In other words, when a plurality of recesses 51*br* are provided as in the reinforcing film 51 according to the first embodiment, again, the reinforcing film 51*b* is formed so as to satisfy the same relationship for tangent lines a1 to a4 and thicknesses Y1 to Y4 with the newly defined tangent line a and thickness Y.

With such a configuration, the thickness Y of the reinforcing film 51*b* can be divided into two layers at the position of the recess 51*br* as a boundary. Therefore, the reinforcing film 51*b* may be easily formed by forming the surface slope in two layers, compared to the case where the surface slope is formed in one layer.

Furthermore, the recess 51*br* of the reinforcing film 51*b* facilitates deformation when the reinforcing film 51*b* is displaced in the +Y direction along with the displacement of the diaphragm 50. Therefore, the recess 51*br* can relieve the compressive stress applied to the reinforcing film 51*b*. The same effect can be achieved in the case of the plurality of recesses 51*r* as in the first embodiment.

C. Third Embodiment

Figure 21:
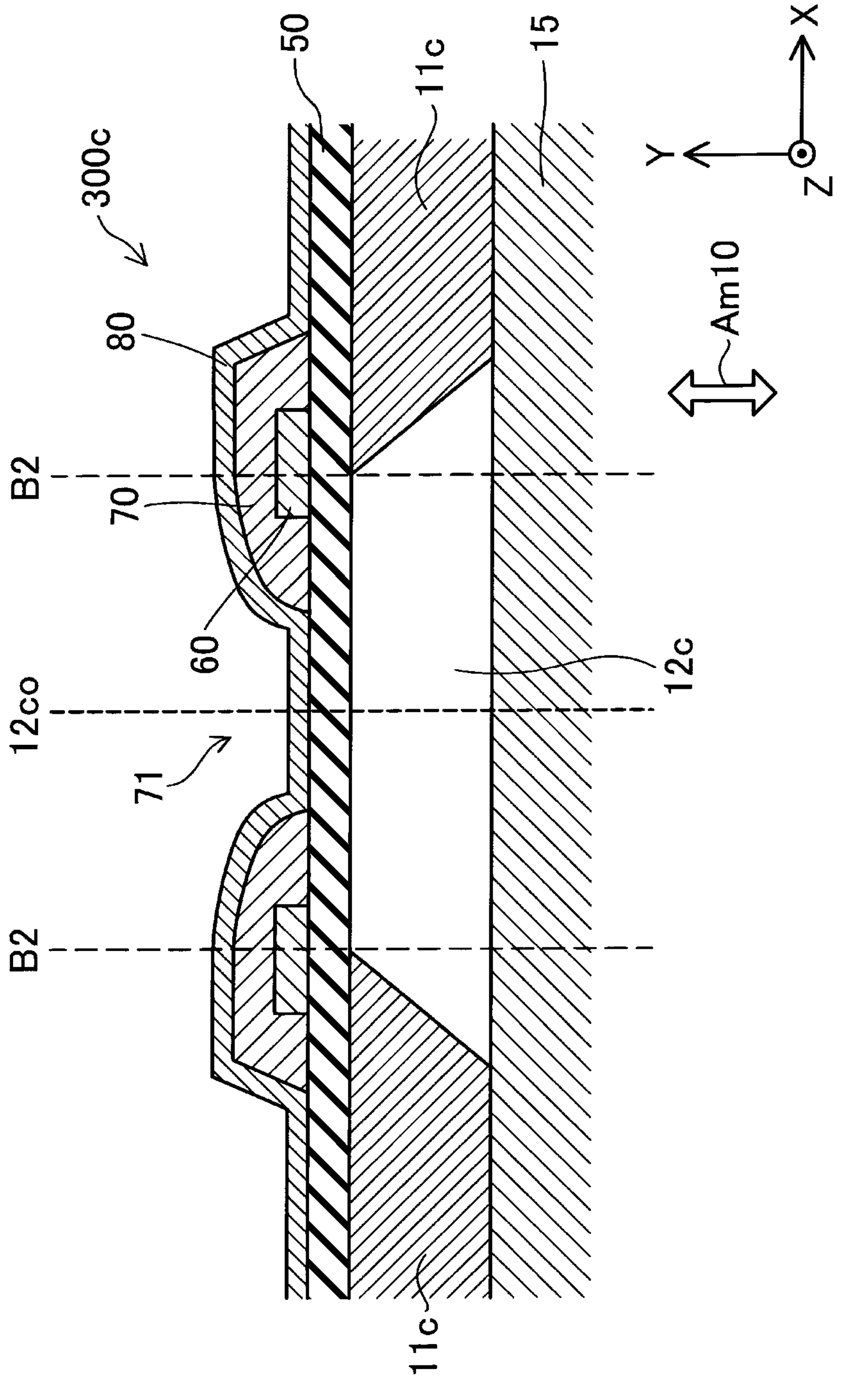
FIG. 21 is a sectional view illustrating a cross section of a pressure chamber according to a third embodiment.

FIG. 21 is a cross-sectional view illustrating a cross section of a pressure chamber 12*c* according to a third embodiment. FIG. 21 illustrates a cross section corresponding to that illustrated in FIG. 6 according to the first embodiment. The pressure chamber 12*c* according to the third embodiment has a space that extends to piezoelectric elements 300*c* adjacent to each other in the X-axis direction so as to straddle a groove 71. Therefore, a boundary B2 between a partition wall 11*c* and the pressure chamber 12*c* is located at the same position as the piezoelectric element 300*c* in the X-axis direction. That is, the piezoelectric element 300*c* is formed so as to overlap the boundary B2 between the partition wall 11*c* and the pressure chamber 12*c* when viewed along the lamination direction Am10.

A thickness of the piezoelectric element 300*c* in the Y-axis direction on the side closer to the center 12*co* of the pressure chamber 12*c* than the boundary B2 is determined based on Formula (3), as with the thickness Y of the reinforcing film 51 illustrated in FIG. 10, from the boundary B2 to the groove 71. Therefore, the piezoelectric element 300*c* is formed such that the thickness Y of the piezoelectric element 300*c* decreases from the boundary B1 toward the center 12*co* of the pressure chamber 12. That is, the reinforcing film 51 is not provided in the third embodiment. Instead, the piezoelectric element 300*c* has a cross-sectional shape based on FIG. 10, thus dispersing stress generated in the diaphragm 50.

Figure 22:
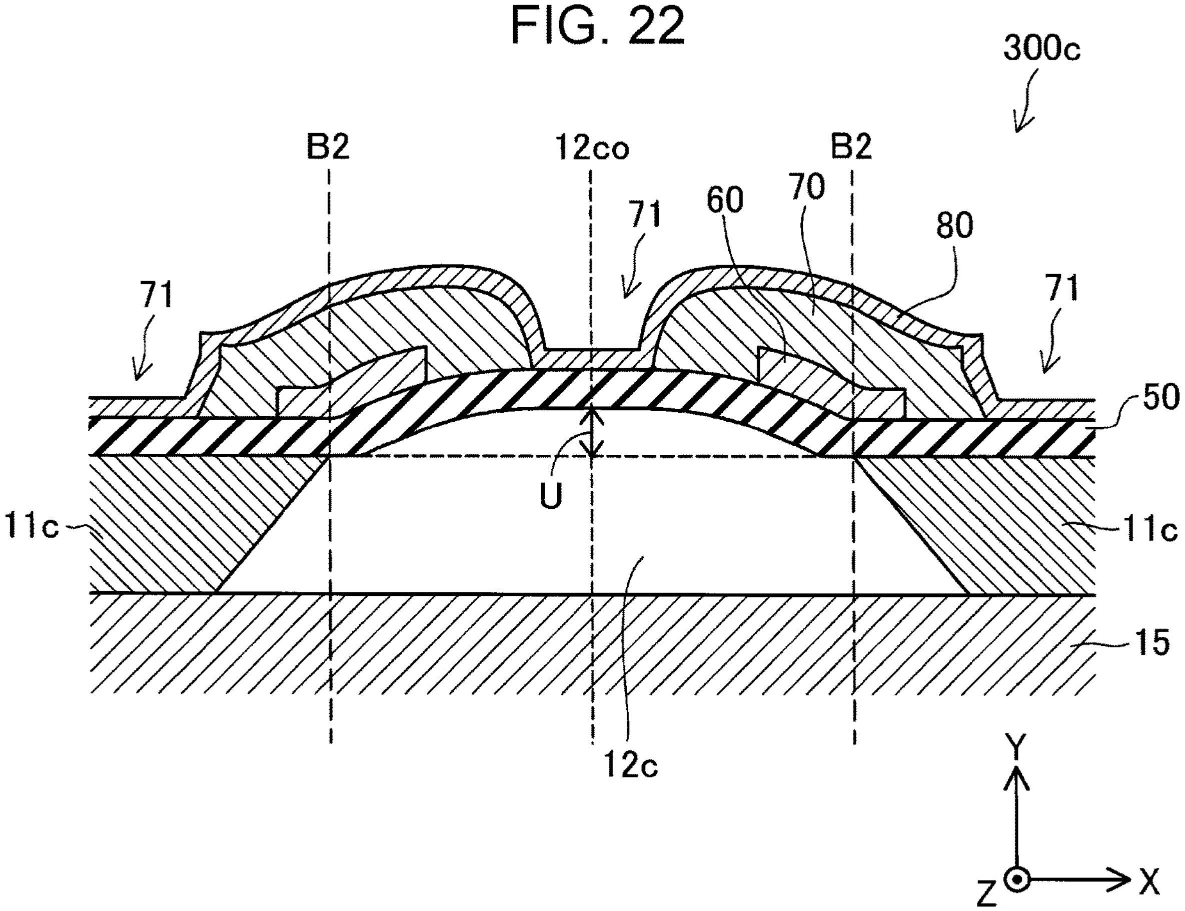
FIG. 22 is an explanatory diagram illustrating a diaphragm after displacement according to the third embodiment.

FIG. 22 is an explanatory diagram illustrating the diaphragm 50 after displacement according to the third embodiment. FIG. 22 illustrates a state where the diaphragm 50 is displaced by a displacement amount U under the pressure applied to the diaphragm 50 in the +Y direction. As illustrated in FIG. 22, the displacement of the diaphragm 50 occurs at the position of the groove 71 between the adjacent piezoelectric elements 300*c*. Therefore, stress concentration occurs at the boundary B2 of the diaphragm 50.

The piezoelectric element 300*c* is formed to become thinner from the boundary B2 toward the center 12*co* of the pressure chamber 12, and thus has a section modulus to obtain uniform bending moment. Therefore, the piezoelectric element 300*c* can reduce the possibility of stress being concentrated at one point in the direction from the boundary B2 toward the center 12*co* of the pressure chamber 12*c*. That is, the possibility of cracks occurring in the diaphragm 50 can be reduced.

D. Fourth Embodiment

Figure 23:
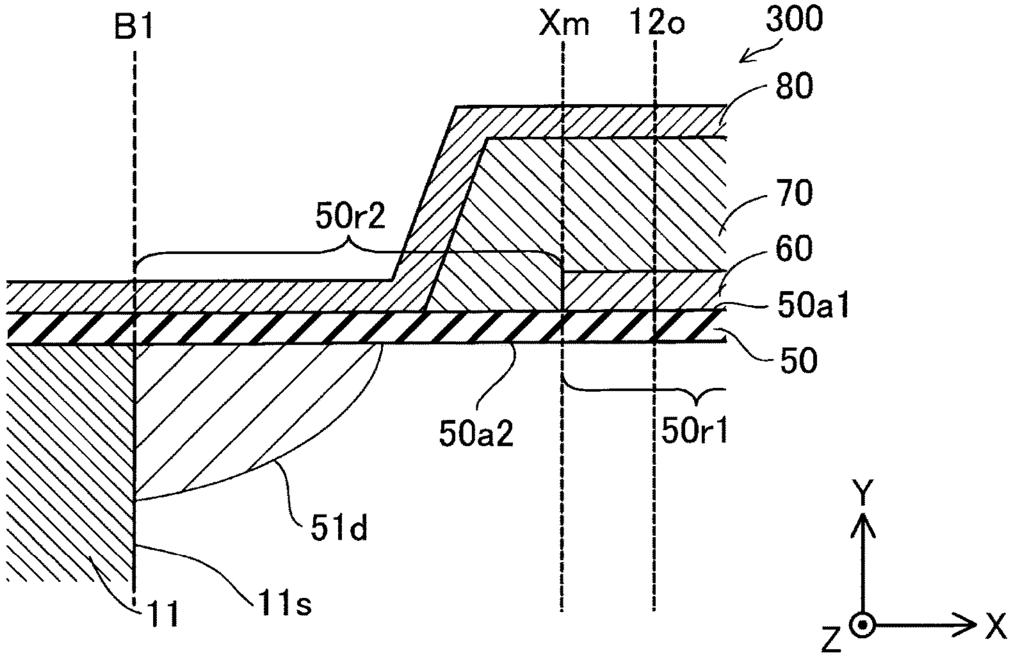
FIG. 23 is an explanatory diagram illustrating a reinforcing film according to a fourth embodiment.

FIG. 23 is an explanatory diagram illustrating a reinforcing film 51*d* according to a fourth embodiment. In the above embodiment, the reinforcing film 51 is formed on the first surface 50*a*1. However, the reinforcing film 51 may be formed on the second surface 50*a*2. For example, the reinforcing film 51*d* can be formed across the partition wall 11 and the diaphragm 50, as the reinforcing film 51*d* illustrated in FIG. 23. As described above, overlapping the boundary B1 between the partition wall 11 and the pressure chamber 12 includes overlapping from the position of the wall surface 11*s* of the partition wall 11 facing the pressure chamber 12 in the X-axis direction to the pressure chamber 12. That is, the reinforcing film 51*d* reinforces the boundary B1 so as to cover it from the second surface 50*a*2.

With such a configuration, the reinforcing film 51*b* can directly reinforce the boundary B1 between the partition wall 11 and the pressure chamber 12 where stress concentration is concentrated. Therefore, the reinforcing film 51*b* can more accurately reinforce the boundary B1 than when reinforcing from the first surface 50*a*1 where the partition wall 11 is not present.

E1. Modification 1

In the first embodiment, the reinforcing film 51 includes the recess 51*r* at the end portion 51*s*. However, the reinforcing film 51 may be formed along the trajectory T1 so that the end portion 51*s* does not have the recess 51*r*. The recess 51*r* is formed by laminating the materials of the reinforcing film 51. Therefore, increasing the number of layers laminated, for example, can reduce the size of the recess 51*r*. Specifically, in practice, it is possible to form the end portion 51*s* having the same section modulus as that of the shape of the end portion 51*s* formed along the trajectory T1.

E2. Modification 2

In the first embodiment, the thickness Y of the end portion 51*s* of the reinforcing film 51 is defined so as to satisfy the conditions of Formulas (1) and (2). However, at the third position X3, which is an intermediate position between the first position X1 and the second position X2, the thickness Y of the end portion 51*s* may be defined so as to satisfy Formulas (7), (8), and (9) where Y3 is the thickness of the end portion 51*s* and a3 is the absolute value of the slope of the tangent line a.

$$Y1 > Y3 > Y2 \tag{7}$$

$$0 > a1 > a3 > a2 \tag{8}$$

$$|Y1 - Y3| < |Y1 - Y3| \tag{9}$$

With such a configuration, the reinforcing film 51 is formed more closely to the trajectory T1 than when defined by Formulas (1) and (2). That is, the reinforcing film 51 may be able to reduce the stress concentration in the diaphragm 50, compared to the first embodiment.

E3. Modification 3

In the first embodiment, the reinforcing film 51 is defined by Formulas (1) and (2). However, the reinforcing film 51 may also be defined by Formula (10), taking into consideration actual manufacturing errors. The reinforcing film 51 satisfies Formula (10), where L is a first distance between the boundary B1 and the end portion 51*s* of the reinforcing film 51 closest to the center 12*o* of the pressure chamber 12 in the direction from the boundary B1 to the center 12*o* of the pressure chamber 12. Note that the second distance X2 is also the distance from the first position X1 to the second position X2.

$$Y1 \times \sqrt{\frac{|X2 - L|}{L}} \times 0.8 \leq Y2 \leq Y1 \times \sqrt{\frac{|X2 - L|}{L}} \times 1.2 \tag{10}$$

With such a configuration, the reinforcing film 51 has stress more evenly distributed than when defined by Formulas (1) and (2).

Formula (10) has a tolerance of ±20% for manufacturing errors, which may be ±30% or between +20% and −10%, depending on the actual manufacturing ability.

The reinforcing film 51 does not need to be defined by Formulas (1) and (2). That is, the reinforcing film 51 may be defined only by Formula (10).

E4. Modification 4

In the above embodiment, the reinforcing film 51 is formed by laminating materials. However, the reinforcing film 51 may also be formed of a material that solidifies from a fluid, such as an adhesive or UV ink. For example, by changing the wettability of the surface of the diaphragm 50 at the position where the tip 51*sc* of the reinforcing film 51 is to be provided, the amount of the material of the reinforcing film 51 flowing before solidification changes. That is, the curved shape of the inclined surface 51*sa* of the reinforcing film 51 can be adjusted by changing the wettability of the surface of the diaphragm 50 and the surface tension of the material of the reinforcing film 51 before solidification.

F. Modification (1) In the above embodiment, the reinforcing film 51 is formed within the groove 71 so as to straddle the adjacent pressure chambers 12, as illustrated in FIG. 7. However, the reinforcing film 51 does not necessarily have to be formed so as to straddle the adjacent pressure chambers 12. The reinforcing film 51 may be formed so as to cover the boundary B1 when viewed along the lamination direction Am10. That is, the reinforcing film 51 may be formed by two reinforcing films 51 for each of the two boundaries B1 within the range of the groove 71. A plurality of reinforcing films 51 may be formed.

(2) In the above embodiment, the reinforcing film 51 is formed in a rectangular shape that is elongated in the Z-axis direction, as illustrated in FIG. 7. However, the reinforcing film 51 is not limited to the rectangular shape. As described above, the reinforcing film 51 may have a square or elliptical shape as long as it can overlap the boundary B1 between the partition wall 11 and the pressure chamber 12 when viewed in the lamination direction Am10.

As illustrated in FIG. 7, the reinforcing film 51 is formed at the center of the active section 50*r*1 in the Z-axis direction. However, the position of the reinforcing film 51 is not limited to the center of the active section 50*r*1. For example, in FIG. 7, the reinforcing film 51 may be formed closer to the nozzle 21 in the +Z direction than the center of the active section 50*r*1. Alternatively, the reinforcing film 51 may be formed over the entire range of the groove 71.

The reinforcing film 51 does not need to be formed in the same way as the grooves 71 adjacent to each other in the X-axis direction, as illustrated in FIG. 7. For example, in the second pressure chamber array Lb of FIG. 3, the reinforcing film 51 may be formed so as to be smaller in the groove 71 located at the end of the array and to be larger in the groove 71 located at the center of the array. Alternatively, the position and shape of the reinforcing film 51 may be different in each of the plurality of grooves 71.

(3) In the above embodiment, the reinforcing film 51 is formed so as to be in contact with the second electrode 80 on the diaphragm 50. However, the reinforcing film 51 may be formed in contact with the diaphragm 50 when the second electrode 80 is not present in the groove 71 as described above. Alternatively, when the piezoelectric layer 70 is present in the groove 71, the reinforcing film 51 may be formed in contact with the piezoelectric layer 70.

(4) In the above embodiment, the diaphragm 50 is made of zirconium oxide. The reinforcing film 51 is made of an organic material. However, the reinforcing film 51 may be made of the same material as the diaphragm 50. That is, the reinforcing film 51 may be made of zirconium oxide or the material of the diaphragm 50 to be described later.

(5) In the above embodiment, the piezoelectric layer 70 is made of lead zirconate titanate (PZT). The reinforcing film 51 is made of an organic material. However, the reinforcing film 51 may be made of the same material as the piezoelectric layer 70. That is, the reinforcing film 51 may be made of lead zirconate titanate (PZT) or the material of the piezoelectric layer 70 to be described later.

(6) In the above embodiment, the recess 51*r* is a step of the thickness Y on the inclined surface 51*sa*. That is, the recess 51*r* is a recess formed in the thickness direction of the reinforcing film 51. However, the recess 51*r* does not have to be recessed in the thickness direction. For example, the recess 51*r* may have a shape with an inflection point or a non-differentiable point on the inclined surface 51*sa*.

(7) In the above embodiment, the slope of the tangent line a at the measurement point may be, for example, the slope between two points moved by ±L/10 along the X-axis direction. Alternatively, the average value of the slopes of the tangent lines at an arbitrary number of measurement points within the range of ±L/10 along the X-axis direction may be used as the slope of the tangent line a.

G. Modification (1) In the above embodiment, the shape of the pressure chamber 12 is not limited to a rectangular shape, but may be a parallelogram, a polygon, a circle, an oval, or the like. The oval shape herein refers to a shape based on a rectangular shape with semicircular ends at both ends in the longitudinal direction, including a rounded rectangular shape, an elliptical shape, and the like.

(2) In the above embodiment, the arrangement direction Am21 means a macroscopic arrangement direction Am21 of the plurality of pressure chambers 12. For example, when a plurality of pressure chambers 12 are arranged along the X-axis direction so as to be alternated in the intersecting direction Am30, the X-axis direction is included in the arrangement direction Am21.

(3) In the above embodiment, the groove 71 is formed by completely removing the piezoelectric layer 70 in the Y-axis direction. However, the piezoelectric layer 70 removed in the +Y-axis direction may be left in the groove 71. That is, the groove 71 may be formed thinner than other portions of the piezoelectric layer 70.

H. Other Embodiments

The present disclosure is not limited to the embodiments described above, and can be realized in various forms without departing from the spirit thereof. For example, the present disclosure can also be realized in the following forms. The technical features in the above embodiments that correspond to the technical features in each aspect described below can be replaced or combined as appropriate to solve some or all of the problems of the present disclosure, or to achieve some or all of the effects of the present disclosure. Further, the technical features can be deleted as appropriate unless described as essential in this specification.

(1) According to one aspect of the present disclosure, a liquid ejecting head is provided. The liquid ejecting head includes: a piezoelectric element that includes a first electrode, a piezoelectric layer, and a second electrode, which are laminated in a lamination direction, and that deforms when a voltage is applied; a diaphragm that vibrates by driving the piezoelectric element; a reinforcing film; and a pressure chamber substrate constituting a partition wall that defines a pressure chamber communicated with a nozzle, together with the diaphragm, wherein the diaphragm applies pressure to a liquid in the pressure chamber by being vibrated in the lamination direction by the piezoelectric element, the reinforcing film is formed along a first direction that is perpendicular to the lamination direction, overlaps a boundary between the partition wall and the pressure chamber when viewed in the lamination direction, and satisfies Formula (1) and Formula (2) below, $$Y1 > Y2 \quad (1)$$

and $$0 < a1 < a2 \quad (2)$$

where Y1 is a first thickness of the reinforcing film in the lamination direction at a first position as a position of the boundary, Y2 is a second thickness of the reinforcing film in the lamination direction at a second position closer to the center of the pressure chamber than the first position, a1 is an absolute value of a slope of a first tangent line, to an inclined surface as a surface of the reinforcing film that is not in contact with the diaphragm, at the first position, a2 is an absolute value of a slope of a second tangent line at the second position, in a cross section parallel to the lamination direction and a direction from the boundary to the center of the pressure chamber. With such a configuration, the reinforcing film of the present disclosure is formed on the diaphragm so as to cover the first position, which is the boundary between the partition wall and the pressure chamber. Furthermore, the reinforcing film is formed to have a thickness that decreases at the second position on the pressure chamber side of the boundary. The thickness deceases more sharply at the second position than the first position. This can reduce the possibility of stress being concentrated at one point in the direction from the boundary to the pressure chamber. That is, the reinforcing film can reduce the possibility of cracks occurring in the diaphragm.

(2) In the liquid ejecting head according to the above aspect, when a region of the diaphragm where the first electrode, the piezoelectric layer, the second electrode, and the pressure chamber overlap when viewed in the lamination direction is defined as an active section, and a region of the diaphragm that is different from the active section and where the pressure chambers overlap when viewed in the lamination direction is defined as a non-active section, the reinforcing film does not need to be formed in the active section and may be formed in a part of the non-active section. With such a configuration, the reinforcing film can reinforce the non-active section where stress is generated by the vibration of the active region, without significantly inhibiting the vibration of the active region.

(3) In the liquid ejecting head according to the above aspect, when a surface of the diaphragm on which the piezoelectric element is provided is defined as a first surface and a surface of the diaphragm on which the pressure chamber substrate is provided is defined as a second surface, in the lamination direction, the reinforcing film may be formed above the first surface of the diaphragm in the lamination direction. With this configuration, the second surface on which the pressure chamber substrate is provided is positioned inside the flow path, as the surface that defines the space of the pressure chamber. Therefore, the reinforcing film can be easily formed on the first surface having less influence on the surroundings of the reinforcing film, compared to the case where the reinforcing film is formed on the second surface.

(4) In the liquid ejecting head according to the above aspect, when a surface of the diaphragm on which the piezoelectric element is provided is defined as a first surface and a surface of the diaphragm on which the pressure chamber substrate is provided is defined as a second surface, in the lamination direction, the reinforcing film may be formed on the second surface side. With such a configuration, the reinforcing film can directly reinforce the boundary between the partition wall and the pressure chamber where stress is concentrated. Therefore, the reinforcing film can reinforce the boundary more accurately than when reinforcing from the first surface without the partition wall.

(5) In the liquid ejecting head according to the above aspect, the reinforcing film may be configured to satisfy above Formula (10)

where L is a first distance between the boundary and an end portion of the reinforcing film closest to the center of the pressure chamber in a direction from the boundary to the center of the pressure chamber, and X2 is a second distance from the first position to the second position. With such a configuration, the stress is distributed more evenly compared to the above aspect.

(6) In the liquid ejecting head according to the above aspect, the reinforcing film may be configured to have the thickness that decreases as it gets closer to the piezoelectric element, and include a recess formed by a step in the thickness on the inclined surface. In the cross section, the recess is disposed at a position closer to the center of the pressure chamber than the second position, and the reinforcing film may also be configured to satisfy Formulas (4), (5), and (6) below $$Y1 > Y2 > Y3 > Y4 \tag{4}$$

$$a3 < a2 \tag{5}$$

$$0 < a3 < a4 \tag{6}$$

where Y3 is a third thickness of the reinforcing film in the lamination direction at a third position as the position of the recess, Y4 is a fourth thickness of the reinforcing film in the lamination direction at a fourth position closer to the center of the pressure chamber than the recess, a3 is an absolute value of a slope of a third tangent line at the third position, and a4 is an absolute value of a slope of a fourth tangent line at the fourth position. With such a configuration, the thickness of the reinforcing film can be divided into two layers at the position of the recess as a boundary. Therefore, the reinforcing film may be easily formed by forming the surface slope in two layers, compared to the case where the surface slope is formed in one layer.

(7) In the liquid ejecting head according to the above aspect, the reinforcing film may be made of the same material as the diaphragm. With such a configuration, there is no need to prepare a material different from that of the diaphragm for the reinforcing film. This may facilitate manufacturing compared to the case of preparing a different material.

(8) In the liquid ejecting head according to the above aspect, the reinforcing film may be made of the same material as the piezoelectric layer. With such a configuration, there is no need to prepare a material different from that of the piezoelectric layer for the reinforcing film. This may facilitate manufacturing compared to the case of preparing a different material.

(9) According to a second aspect of the present disclosure, a liquid ejecting head is provided. The liquid ejecting head includes: a piezoelectric element that includes a first electrode, a piezoelectric layer, and a second electrode, which are laminated in a lamination direction, and that deforms when a voltage is applied; a diaphragm that vibrates by driving the piezoelectric element; a reinforcing film; and a pressure chamber substrate constituting a partition wall that defines a pressure chamber communicated with a nozzle, together with the diaphragm, wherein the diaphragm applies pressure to a liquid in the pressure chamber by being vibrated in the lamination direction by the piezoelectric element, the reinforcing film is formed along a first direction that is perpendicular to the lamination direction, overlaps a boundary between the partition wall and the pressure chamber when viewed in the lamination direction, and satisfies Formula (10) above, where Y1 is a first thickness of the reinforcing film in the lamination direction at a first position as a position of the boundary, Y2 is a second thickness of the reinforcing film in the lamination direction at a second position closer to the center of the pressure chamber than the first position, and L is a first distance between the boundary and an end portion of the reinforcing film closest to the center of the pressure chamber in the first direction, and X2 is a second distance from the first position to the second position, in a cross section parallel to the lamination direction and a direction from the boundary to the center of the pressure chamber. With such a configuration, the stress is distributed more evenly compared to the first aspect.

What is claimed is:

1. A liquid ejecting head comprising:

a piezoelectric element that includes a first electrode, a piezoelectric layer, and a second electrode, which are laminated in a lamination direction, and that deforms when a voltage is applied;

a diaphragm that vibrates by driving the piezoelectric element;

a reinforcing film; and a pressure chamber substrate constituting a partition wall that defines a pressure chamber communicated with a nozzle, together with the diaphragm, wherein the diaphragm applies pressure to a liquid in the pressure chamber by being vibrated in the lamination direction by the piezoelectric element, the reinforcing film is formed along a first direction that is perpendicular to the lamination direction, overlaps a boundary between the partition wall and the pressure chamber when viewed in the lamination direction, and satisfies Formula (1) and Formula (2) below, $$Y1 > Y2 \tag{1}$$

and $$0 < a1 < a2 \tag{2}$$

where Y1 is a first thickness of the reinforcing film in the lamination direction at a first position as a position of the boundary, Y2 is a second thickness of the reinforcing film in the lamination direction at a second position closer to the center of the pressure chamber than the first position, a1 is an absolute value of a slope of a first tangent line, to an inclined surface as a surface of the reinforcing film that is not in contact with the diaphragm, at the first position, a2 is an absolute value of a slope of a second tangent line at the second position, in a cross section parallel to the lamination direction and a direction from the boundary to the center of the pressure chamber.

2. The liquid ejecting head according to claim 1, wherein when a region of the diaphragm where the first electrode, the piezoelectric layer, the second electrode, and the pressure chamber overlap when viewed in the lamination direction is defined as an active section, and a region of the diaphragm that is different from the active section and where the pressure chambers overlap when viewed in the lamination direction is defined as a non-active section, the reinforcing film is not formed in the active section and formed in a part of the non-active section.

3. The liquid ejecting head according to claim 2, wherein the reinforcing film is formed above the diaphragm in the lamination direction.

4. The liquid ejecting head according to claim 2, wherein when a surface of the diaphragm on which the piezoelectric element is provided is defined as a first surface and a surface of the diaphragm on which the pressure chamber substrate is provided is defined as a second surface, in the lamination direction, the reinforcing film is formed on the second surface side.

5. The liquid ejecting head according to claim 1, wherein the reinforcing film satisfies Formula (3) below $$Y1\times\sqrt{\frac{|X2-L|}{L}}\times 0.8\leq Y2\leq Y1\times\sqrt{\frac{|X2-L|}{L}}\times 1.2 \quad (3)$$

where L is a first distance between the boundary and an end portion of the reinforcing film closest to the center of the pressure chamber in a direction from the boundary to the center of the pressure chamber, and X2 is a second distance from the first position to the second position.

6. The liquid ejecting head according to claim 1, wherein the reinforcing film has the thickness that decreases as it gets closer to the piezoelectric element, and includes a recess formed by a step in the thickness on the inclined surface, in the cross section, the recess is disposed at a position closer to the center of the pressure chamber than the second position, and the reinforcing film also satisfies Formulas (4), (5), and (6) below $$Y1 > Y2 > Y3 > Y4 \quad (4)$$

$$a3 < a2 \quad (5)$$

$$0 < a3 < a4 \quad (6)$$

where Y3 is a third thickness of the reinforcing film in the lamination direction at a third position as the position of the recess, Y4 is a fourth thickness of the reinforcing film in the lamination direction at a fourth position closer to the center of the pressure chamber than the recess, a3 is an absolute value of a slope of a third tangent line at the third position, and a4 is an absolute value of a slope of a fourth tangent line at the fourth position.

7. The liquid ejecting head according to claim 1, wherein the reinforcing film is made of the same material as the diaphragm.

8. The liquid ejecting head according to claim 1, wherein the reinforcing film is made of the same material as the piezoelectric layer.

9. A liquid ejecting head comprising:

a piezoelectric element that includes a first electrode, a piezoelectric layer, and a second electrode, which are laminated in a lamination direction, and that deforms when a voltage is applied;

a diaphragm that vibrates by driving the piezoelectric element;

a reinforcing film; and a pressure chamber substrate constituting a partition wall that defines a pressure chamber communicated with a nozzle, together with the diaphragm, wherein the diaphragm applies pressure to a liquid in the pressure chamber by being vibrated in the lamination direction by the piezoelectric element, the reinforcing film is formed along a first direction that is perpendicular to the lamination direction, overlaps a boundary between the partition wall and the pressure chamber when viewed in the lamination direction, and satisfies Formula (3) below, $$Y1\times\sqrt{\frac{|X2-L|}{L}}\times 0.8\leq Y2\leq Y1\times\sqrt{\frac{|X2-L|}{L}}\times 1.2 \quad (3)$$

where Y1 is a first thickness of the reinforcing film in the lamination direction at a first position as a position of the boundary, Y2 is a second thickness of the reinforcing film in the lamination direction at a second position closer to the center of the pressure chamber than the first position, and L is a first distance between the boundary and an end portion of the reinforcing film closest to the center of the pressure chamber in the first direction, and X2 is a second distance from the first position to the second position, in a cross section parallel to the lamination direction and a direction from the boundary to the center of the pressure chamber.

* * * * *